US008918197B2

(12) United States Patent
Suhami

(10) Patent No.: US 8,918,197 B2
(45) Date of Patent: Dec. 23, 2014

(54) AUDIO COMMUNICATION NETWORKS

(76) Inventor: Avraham Suhami, Petah Tikva (IL)

( * ) Notice: Subject to any disclaimer, the term of this patent is extended or adjusted under 35 U.S.C. 154(b) by 244 days.

(21) Appl. No.: 13/495,648

(22) Filed: Jun. 13, 2012

(65) Prior Publication Data

US 2013/0337796 A1    Dec. 19, 2013

(51) Int. Cl.
*G06F 17/00* (2006.01)
*G10L 21/00* (2013.01)
*G10L 21/06* (2013.01)
*G10L 25/00* (2013.01)
*H04M 1/00* (2006.01)
*H04M 9/00* (2006.01)
*H04R 25/00* (2006.01)

(52) U.S. Cl.
USPC ........ 700/94; 704/207; 704/271; 379/390.02; 381/320

(58) Field of Classification Search
CPC .................. G10L 21/00; G10L 21/003; G10L 2021/0135; G10L 2021/065; G10L 21/0205; G10L 25/18; H04M 3/569
USPC .................... 700/94; 704/207, 223, 224, 271; 379/52, 88.01, 88.19, 93.26, 142.06, 379/390.02
See application file for complete search history.

(56) References Cited

U.S. PATENT DOCUMENTS

| | | | |
|---|---|---|---|
| 6,377,637 B1 | 4/2002 | Berdugo | |
| 6,563,885 B1 | 5/2003 | Magee | |
| 6,813,490 B1 | 11/2004 | Lang | |
| 6,840,908 B2 | 1/2005 | Edwards | |
| 7,496,205 B2 | 2/2009 | Kuhnel | |
| 7,529,545 B2 | 5/2009 | Rader | |
| 7,564,979 B2 | 7/2009 | Swartz | |
| 7,680,465 B2 | 3/2010 | Zad-Issa | |
| 7,778,432 B2 | 8/2010 | Larsen | |
| 7,801,570 B2 | 9/2010 | Cheung | |
| 7,854,704 B2 | 12/2010 | Givens | |
| 7,941,315 B2 | 5/2011 | Matsuo | |
| 8,060,361 B2 | 11/2011 | Wong | |
| 8,107,636 B2 | 1/2012 | McLeod | |
| 8,108,211 B2 | 1/2012 | Baqai | |
| 8,155,359 B2 | 4/2012 | Beck | |
| 8,195,454 B2 | 6/2012 | Muesch | |
| 8,208,970 B2 | 6/2012 | Cheung | |
| 2009/0313018 A1* | 12/2009 | Degani et al. | 704/250 |
| 2012/0215532 A1* | 8/2012 | Foo et al. | 704/235 |
| 2013/0030800 A1* | 1/2013 | Tracey et al. | 704/219 |

* cited by examiner

*Primary Examiner* — Jesse Elbin

(57) ABSTRACT

As the possible variations of "Hearing Thresholds", "Hearing Loudness bandwidths" and "Voice Intonation" characteristics of people are finite, it is proposed to set a Database of these characteristics, where the data elements fully describe the Hearing and Talking characteristics of anyone, while many have the same characteristics. Thus any voice communication between two parties may be optimized by correcting the intensities of the call in the spectral domain, differently for each party and each ear. The optimizations are automatic given the "codes" of the parties and have a minimal latency. The system may be implemented either centrally in the world-wide-web or at the edges, in cellular phones, landline phones, VoIP, VoIM and in the audio parts of entertainment devices.

15 Claims, 12 Drawing Sheets

AUDIO COMMUNICATION NETWORKS

FIELD OF THE INVENTION

This invention relates to audiology related communication networks

This application claims the benefit of U.S. Utility patent application Ser. No. 13/430,728 filed on Mar. 27, 2012 titled "Cellphone Managed Hearing Eyeglasses" incorporated herein in its entirety by reference.

BACKGROUND

Audio communications between people, directly, through telephones or cellular phones always involves the parties respective hearing and talking capabilities. Intelligibility of a conversation has always been dependent both on the hearing and talking ways and capabilities. Historically, the trend has been to try and find technological remedies to the hearing impairment part, as there was no way to control the talking side. However, the prevalence of the cellular phone in our day-to-day life opens a new era in audio communications where the goal of maximal intelligibility by adapting the hearing of one party to the talking way of the other party may be optimized.

A Hearing-aid enhances hearing by amplifying voices detected by a sensitive microphone, while bringing an individual's reduced hearing response at various audible frequencies, to the level of hearing of a normal person, which is defined roughly as the ability to hear sounds on an absolute scale of 0 to 25 dB at 250 Hz to 6-8 kHz. The modified sound is then delivered into the user's ear canal. Hearing-aids also use various algorithms to suppress noise, echo and eliminate receiver-to-microphone acoustic feedback.

The advent of cellular phones has accentuated many problems for the hearing impaired people wearing one of the Hearing-aids in or behind the ear, although some of these problems also exist with landline telephones. The electro-magnetic interferences between the cellular phone and the "Hearing-aid" when they are in close distance cause superfluous noises, in addition to the physical encumbrance caused by placing the cell-phone over or close to the Hearing-aid. Several solutions to these problems have been devised, including the use of inductive communication between the cell-phone and the Hearing aid device through the use of telecoils, and shielding the cellphones in order to reduce the causes of interferences. However to the best of our knowledge no radical solution to the hearing impaired people using cellular phones has been suggested nor implemented. In this invention we are suggesting that all incoming calls should already include the correction that otherwise would have been made by the "Hearing-aid", thus avoiding the use of the hearing aid when taking a call.

The emerging G.722 standard enabling 50 Hz to 7 kHz wideband voice communication will soon be used in Voice over IP (for example in SKYPE), Internet (IP) and Cellular Communications. Implementing the G.722 standard in Public Switched Telephone Networks will replace the current narrow band (200 Hz to 3400 Hz) with wideband (50 Hz-7 kHz) telephony and enable to introduce the wideband personal hearing correction over landline telephony.

The advent of video-phones improved the intelligibility of a conversation by providing to the parties additional cues, such as lips reading and facial expressions that add to the audio message and lets the brain to combine all signals and optimize understanding.

In this invention we add two additional improvements to the intelligibility of audio communications, adapting the Hearing spectral response of one party to the spectral speech intonations of the other party and "dilation" of syllables on account of "pauses" between syllables.

SUMMARY OF THE INVENTION

The invention describes a mode of correcting electronic voice communications between the source and the destination of said communications, before reaching said destination, so that speech reaching the communicating parties, will be more intelligible than the speech reaching them without said corrections.

The corrections described in this invention are based on the "Hearing profile" of a person, as adapted to the voice intonations of the party he is talking to. In addition the elimination of noise at both sides of the communication line contributes to the intelligibility of the call. Moreover, a unique concept, the amplification of syllables by "time dilation" during speech is used to make it more intelligible.

These corrections further described below in the section of "detailed description of the preferred embodiments" are also suitable for future wideband landline communications, making calls through POTS more intelligible.

The correction we propose will be compatible with the G.722 ITU standard extending the audio bandwidth from 50 Hz to 7 kHz; consequently the user's hearing profile will have to be measured at this bandwidth.

Speech intelligibility is a complex topic, and depends both on the source of the speech, the hearing of the addressee, the sound environment at both sides, and the phone used.

Speech intelligibility is improved when the parties are in visual contact and consequently benefit from additional cues such as lip reading and other facial signs, that unconsciously help understanding the speech. Thus for example conducting a conversation using the cell-phone video, like the "facetime" of Apple, is of great help, as is a wideband landline video-telephone.

The corrections can be implemented at various "stations" along the communication network, depending on the economics of the implementation; they can be incorporated into the user's cell-phone or landline telephones, be it by VoIM application, by TCP/IP or cellular communications, by adding a software or hardware accessory to the various phones. The hearing corrections may also be implemented at the Gateways of the Internet, where proxy servers containing the "hearing profiles" and characteristic "voice intonations" of the parties are stored. The corrections, are implemented in hardware "equalizers" and add minimal latency to the communications between the source and the destination.

These corrections may all be done at the cellular phone, or a PSTN phone, provided that the sound components, microphones and speakers are all wideband, conforming at the G.722 ITU standard. The "Hearing profile" may be determined interactively in a Q&A session between the hearing impaired person and his phone storing the program. The "Voice intonations" of the calling person may also be measured and stored in a "Frequent Callers" file, by applying an FFT transform to the call sampled at 16 kHz and accumulating the data for some time until the resulting curve is smoothed.

A modern smartphone can implement the "correction" by passing the incoming call through a software audio equalizer that selectively amplifies certain frequency bands in amounts derived from the user's "Hearing profile" and the caller's prestored "Voice intonations" factors.

However there is an economic advantage doing the correction centrally on the internet. While every person has his own correction profile for both ears, it has to be realized that there are only a finite number of possible "corrections" given a limited bands of frequencies, limited levels of loudnesses acceptable to the person taking the call, and limited "Voice intonations" of the caller. Given the constraints of continuity between frequencies, the continuity of "change" and the general shape of the loudness curves, the gamut of possibilities narrows immensely.

In this invention we show that if we define "substantially different" loudness" as loudness more than ±5 decibels, there are no more than a few hundreds of different possible "corrections" for each ear, given the variety of "Voice intonations" of the calling party. Consequently if the corrections are carried out by fast hardware equalizers, a relatively small number of differently preset equalizers are sufficient for carrying out all possible corrections, with minimal delay, provided that the needed corrections are predefined by the personal codes of the parties. Thus each and every preset equalizer may service, on a time-shared basis, thousands of callers that happen to need the same correction.

Noise riding speech phonemes or syllables may substantially be reduced by following speech samples in time with a fine time resolution and locating the natural "intervals" between phonemes, syllables and words. As noise is, with high degree of probability, present both during said "intervals" and during the following speech segments, subtracting the noise frequency amplitudes from the following speech frequency amplitudes, improves the Signal-to-Noise-Ratio, during speech. This strategy is already applicable in communication networks for avoiding transmission of noise during non-speech intervals. We suggest to implement a variant of this strategy for detecting noise between phonemes and syllables and subtracting it from following speech. This kind of cleaning the speech stream from noise detected in-between syllables, may be implemented at the entry to the communication network at the level of the phone or at the Gateway of the internet, where the suggested proxy servers are placed.

An additional aspect of measuring the "hearing threshold" is to take in account the "masking" effect, where a note at certain frequency may be masked from being "heard" if another note at a near frequency but higher energy, is present within a "short" time window. Thus for example a 250 Hz note followed within a short while by a 350 Hz note of the same amplitude (but double the energy) will prevent the 250 Hz note of being "heard". These and other brain related effects make the "hearing threshold" measured with pure tones in a noiseless booth with earphones that also discard the amplification effects of the ear pinna, less of an objective measurement of the hearing loss. Consequently the traditional way of measuring an "Audiogram" may over emphasize the hearing impairment, by not taking in account the participation of the brain in the "hearing" process.

Consequently we maintain that the "threshold of hearing" should not be measured with pure tones only but with complex "ringtones" that include in addition to the fundamental notes also several of their harmonics. Alternatively, instead of measuring the "hearing threshold" with single frequency tones, interspersed along the range of 125 Hz to 10 kHz, it should be measured with complex frequency bands covering the same hearing range continuously. As the hearing mechanism is energy cumulative, the loudness of the complex notes for testing the "hearing threshold" should at least be 200 msec long.

In addition the different "thresholds of hearing" should be measured in the field and stored for use in these very different situations.

There are at least 3 different "thresholds of hearing" for each ear: when the sound is coming from earphones, from a speaker juxtaposed to the ear or when the cellphone is at a distance, for example at arms length. Consequently at least 6 "hearing profiles" should be measured, stored and used as a basis for amplification in similar situations.

The threshold of hearing may be measured and recorded either by oneself or from a remote station through a Q&A session for finding the hearing threshold of the party at the other end of the line.

Thus, when transmitting a call, the specific correction needed for the receiving party to better understand the call can be inserted into the transmission, and the noise riding on the speech waveform may be subtracted. The "Hearing Profile" code describing the correction as a function frequency, would be associated with the telephone or cellphone number of a subscriber, if this person is interested to receive calls better suited to his hearing profile.

Sounds detected by the ear are integrated for some tens of milliseconds up to 100 milliseconds or more. This integration time has important consequences for speech intelligibility. Electronic speech processing carried out in parallel and combined with the main speech stream, within several milliseconds are integrated by the ear seamlessly.

The relatively slow sound integration process also explains why speech of "fast talkers" is lesser understood as compared with slowly articulated speech. Therefore, as speech is composed of words and words are composed of syllables and phonemes, with silence intervals between them, it is possible to improve speech intelligibility by moderately expanding the time duration of syllables and phonemes on account of the "interval" durations. For example a two syllable word of 200 millisecond duration may originally be composed of 2 syllables each of 75 msec and a interval in between of 50 msec. Our contention is that if each of the syllables were time-dilated, say by 10%, and the interval in between the syllables reduced proportionally, the intelligibility of the word would improve. The auditory hair cells detecting the sound just vibrate a longer time which is equivalent to amplification by vibrating at a larger amplitude. Reducing moderately the time interval between syllables, while keeping the same average tempo of words does not change much the speech characteristics of a person, while the additional amplification provided without boosting loudness, greatly helps intelligibility.

In VoIM communications such as the SKYPE network, voice communication may be carried out without recourse to the "Phone" application in the operating system's kernel, in order to reach the "audio drivers", but use a different proprietary application, to access the "audio drivers" in the kernel. Consequently VoIM communications networks can bypass "phone" applications whether in PSTN, IP or Cellular networks and supply direct peer-to-peer voice services.

The "Hearing Correction", consists of several features, compensating for the spectral hearing impairment of the call recipient, adapting to the caller's specific spectral intonations, locally "expanding-dilating" the caller's speech and eliminating noise riding on speech elements. The elements of this correction may be implemented in software only or in software-hardware combinations depending on the place of the implementation.

In the previous art all processed speech is delivered to the ear by a tube connected to the speaker. In this invention we also show how to deliver the corrected speech by focusing the sound waves to the person's ear from a distance. This is accomplished by directing a beam of plane waves focused by plastic lenses, to the ear of the person.

DETAILED DESCRIPTION OF THE PREFERRED EMBODIMENTS

Figure 1:
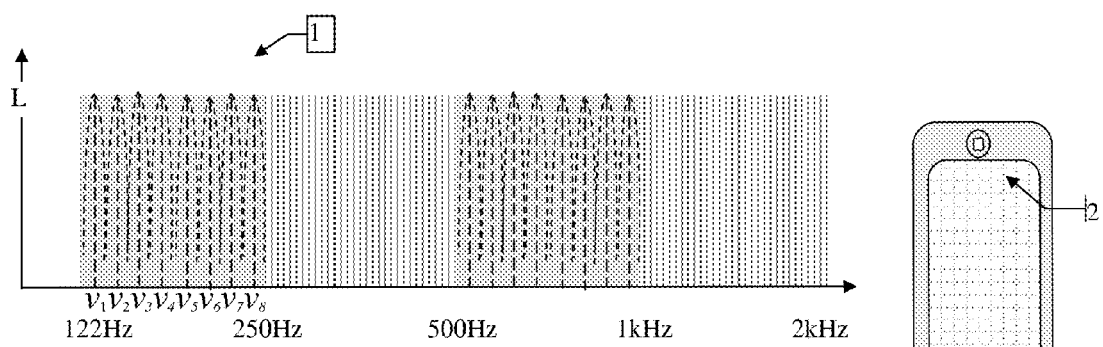
FIG. 1 illustrates a sequence of tone bands extending from 122 Hz to 2 kHz, each band comprising a continuity of tones, each apart from the other.

FIG. 1 illustrates tone bands 1 extending from 122 Hz to 2 kHz, each band comprising a continuity of tones, each apart from the other.

The Hearing threshold of a person may be measured with a cellular phone 2 that emits tones of different frequencies or with a PC that has the proper audio components and software. Determining the hearing profile with bands of notes is more realistic than determining it with pure tones of single frequency and then assigning the result to the entire range of frequencies in the band. This is specifically wrong at the low and high frequencies where the hearing loss changes rapidly within the band and where the masking of one tone by an adjacent tone may misrepresent the reality.

Hearing loss measured with Bands of slightly changing tones gives a better representation of the facts; such bands may be built using software for constructing ringtones and may be prestored in the memory of the cellphone for later use when measuring the Hearing profile of a person; thus the hearing test may be done with such ringtones of multi-tone Bands of frequencies generated ahead of time.

Strings of different notes, may be generated by any cellphone using its tone generator. A ringtone may be generated by entering through a keyboard the code that generates the specific tone, for example using the Ring Tones Text Transfer Language (RTTTL) for NOKIA cellphones. The RTTTL code enables to specify the note, the octave and the duration of the note or an interval between notes. Alternatively the string of ringtones may be generated in any computer and downloaded onto the cell-phone.

Figure 1B:
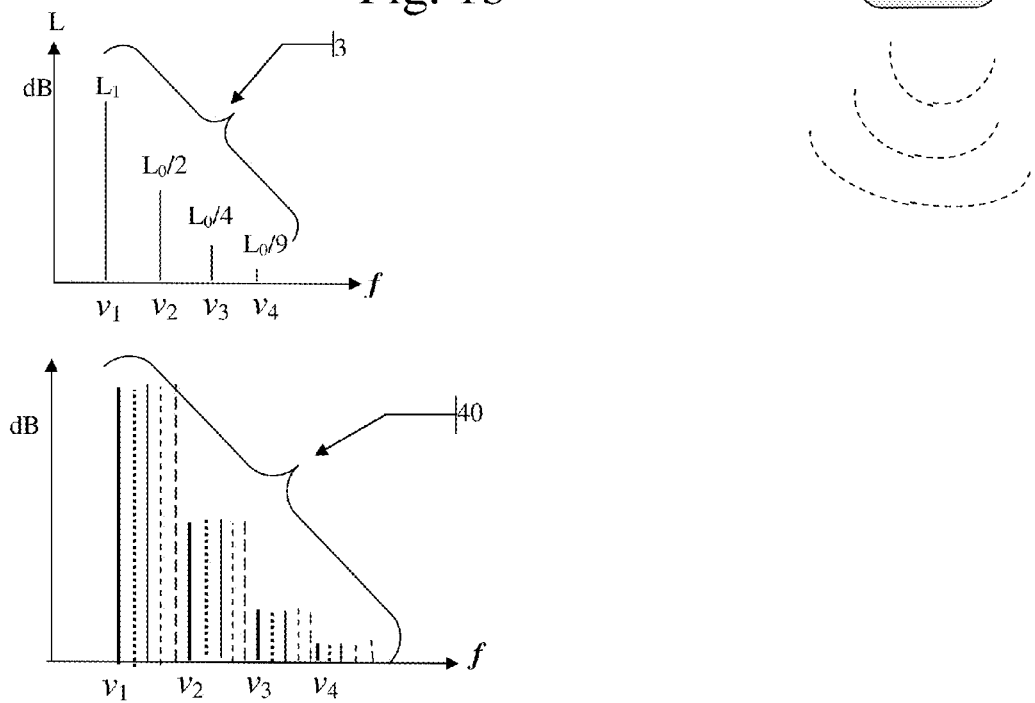
FIG. 1b illustrates a band of complex tones including a fundamental frequency and 3 harmonics of the same energy that may be emitted by the cellphone of the hearing impaired person for determining his hearing threshold.

FIG. 1b illustrates a complex ringtone 3 including a fundamental frequency and three harmonics of the same energy 2 that may be emitted by the cellphone of the hearing impaired person for determining his hearing profile. Bands of closely spaced ringtones 40, each ringtone comprising a fundamental frequency and several harmonics of the fundamental frequency, better represent the hearing mechanism that includes the brain interpretation of the harmonics as a substitute of the fundamental frequency.

Hearing tests ought to be carried with complex tone bands that incorporate harmonics of the fundamental tone, to include the potency of the brain in substituting harmonics where the fundamental note is not physically detected.

As mentioned above, the sound waves emitted by a person or another sound source, are modified both spectrally and in respective loudnesses on their way to a person's tympanic membrane in the ear. Therefore the electronic correction to a person's hearing threshold has to take into account all the modifications done externally. Hearing through the cellphone speaker juxtaposed to the ear, hearing through earphones, hearing a person at a distance or hearing surround music are all different situations; the spectral and loudness hearing thresholds are all different. It is important to realize that a Hearing-aid itself changes the hearing threshold. It is also important to realize that a person wearing a hearing-aid, also hears the sounds reaching his ear directly through the air; it is the combination of the two he is hearing; therefore the Hearing-aid has to correct the combination of the two. Measuring "a" threshold of hearing in a booth and devising a correction accordingly, has limited practical value. In real life situations the needed corrections are different.

It is therefore necessary to measure many hearing thresholds, when listening to cellphone calls. At least, 3 Hearing thresholds for each ear, 6 in total, when the other ear is hermetically plugged, have to be recorded. The 3 Hearing thresholds are for listening to a cell-phone juxtaposed to the ear, when the cellphone is held at a distance at arm's length and for listening through earphones. Obviously, there are other special situations where the hearing thresholds are influenced by the surroundings and the person's position relative to the source of sound; in such special cases the Hearing-aid user has to measure his hearing thresholds and store them in a memory.

Figure 2:
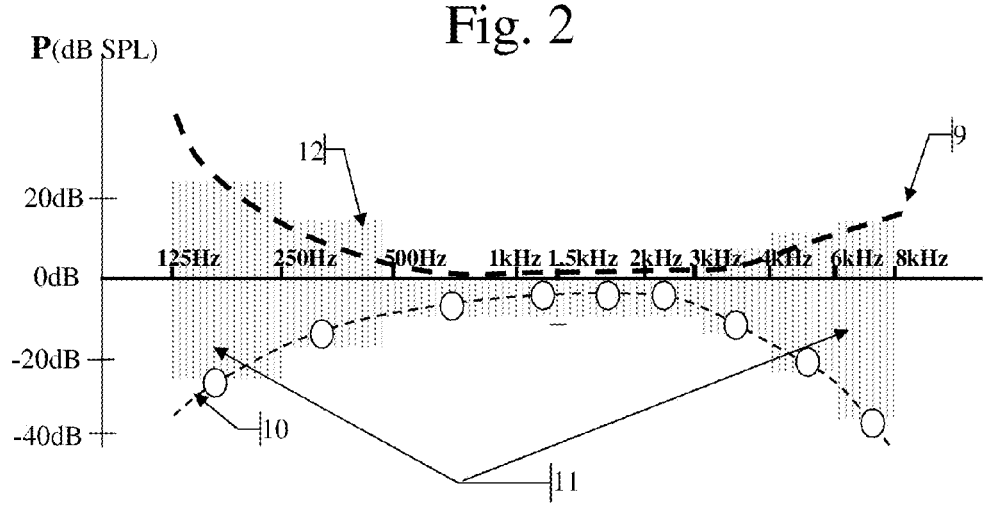
FIG. 2 illustrates the threshold of Hearing of a normal adult and that of a hearing impaired person as measured by a cellphone transmitting complex ringtones. It also illustrates the "same loudness" curves as a function of frequency.
Figure 2:
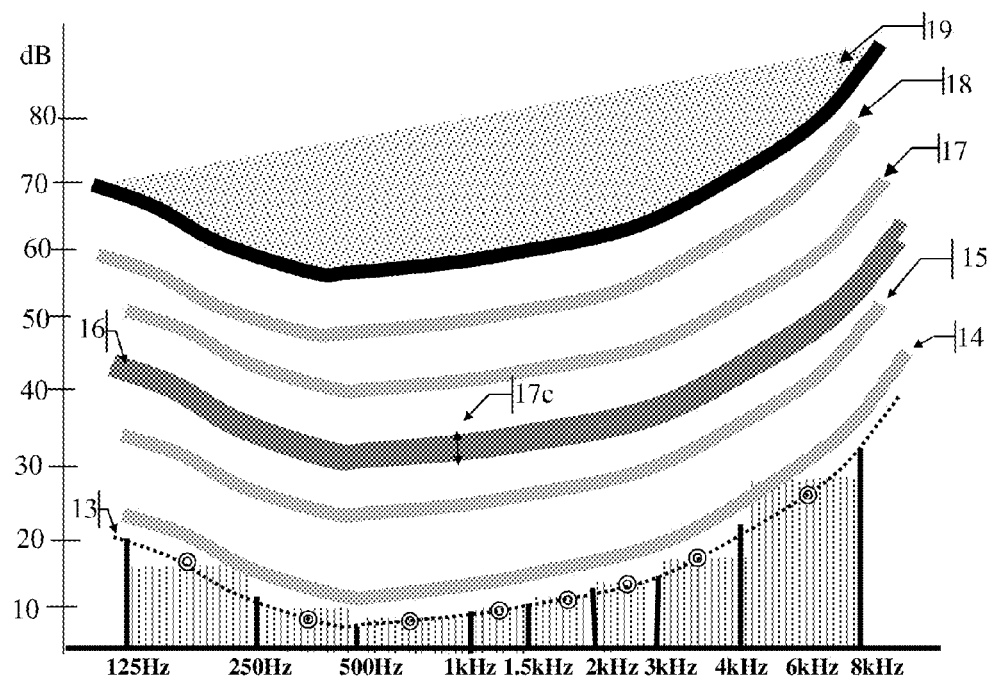

FIG. 2 illustrates the threshold of Hearing 9, 10 of a normal adult and that of a hearing impaired person 11, 12 as measured by a cellphone transmitting complex tone bands. It also illustrates the "equal loudness" curves, 14, 15, 16, 17, 18 and 19 as a function of frequency.

The recording of one of the "Hearing Profile" consists in activating the computer or cellphone to deliver a set of complex tone bands at varying loudnesses, while the user indicates after each band of tones the subjective degree of his Hearing level. In the prior art, the hearing loss is measured at distinct frequencies and interpolated for frequencies in-between the measured ones. In the current invention we prefer to measure the hearing loss by emitting complex tone bands 12 as illustrated in FIG. 1b; such bands include a continuous set of frequencies and several of their harmonics, in order to better reflect the complex ear-brain response. For example if in the prior art of measuring an audiogram the hearing response is measured at Hz and 500 Hz, in our invention we measure the hearing loss at a frequency band that comprise 250 Hz, 312 Hz, 375 Hz, 437 Hz 500 Hz and their harmonics at reduced loudnesses; the user's responses are applied to the entire range of the band. Another way to measure the response of the ear to a frequency band, is to prerecord a complex tone of continuously variable frequencies and their harmonics and measure the response to this tone band.

For self measurement of his "hearing profile", the user is guided step by step by instructions residing in the memory of the Cellphone and displayed on its screen. He then responds through his cellphone keypad. Preferably a set of 8-10 tone bands are delivered by the Cellphone. The user is requested to indicate the loudness he hears preferably by 7 gradations, "Don't hear", "Hear low", "Hear" "Comfortable", "Loud", "Too loud" and "excessive". In a normal person the range of loudnesses may extend up to 80 dBs, while hearing impaired people may have a loudness range as low as 40 dB. The resulting answers are lumped in 6 bands of loudnesses, 14, 15, 16, 17, 18, 19 with some latitude 17c. The average loudness between the "don't hear" and "hear low" is termed as the "Hearing threshold" 13. The "hearing profile" may then be displayed on the cellphone's graphical display as a set of curves of loudness versus frequency, starting from the Hearing threshold amplitudes at the different frequencies up to maximal tolerable amplitudes, which collectively represent the dynamic range of the hearing loudnesses of the user.

The difference between the "Hearing threshold" of a hearing impaired person and a "normal person gives the amplification that the system has to apply at different frequencies for compensating for the hearing loss of the hearing impaired person.

FIG. 2 also illustrates the substantial amplification of the high frequencies relative to low frequencies, done by the ear pinna, resulting in a lower sensitivity at low frequencies. Therefore when trying to compensate for the hearing impairment it is proper, in general, to amplify low frequency sound more than high frequency ones. However the amount of compensation at the high frequencies is dependent on how deep into the ear canal, the processed sound is delivered. When the hearing profile is measured with the earphones the high frequency sounds are less scattered by the pinna and consequently are perceived to be higher in volume.

One of the complaints of people wearing current Hearing-aids, is that "voices sound different". than when talking to a person face-to-face. Therefore the theoretical compensation delineated by the hearing threshold curve 11 that supposedly mandates the needed electronic amplification in order to bring the hearing threshold of a hearing impaired individual to that of a "normal hearing person" usually misses its target, when this threshold is measured in a booth with earphones.

Figure 3:
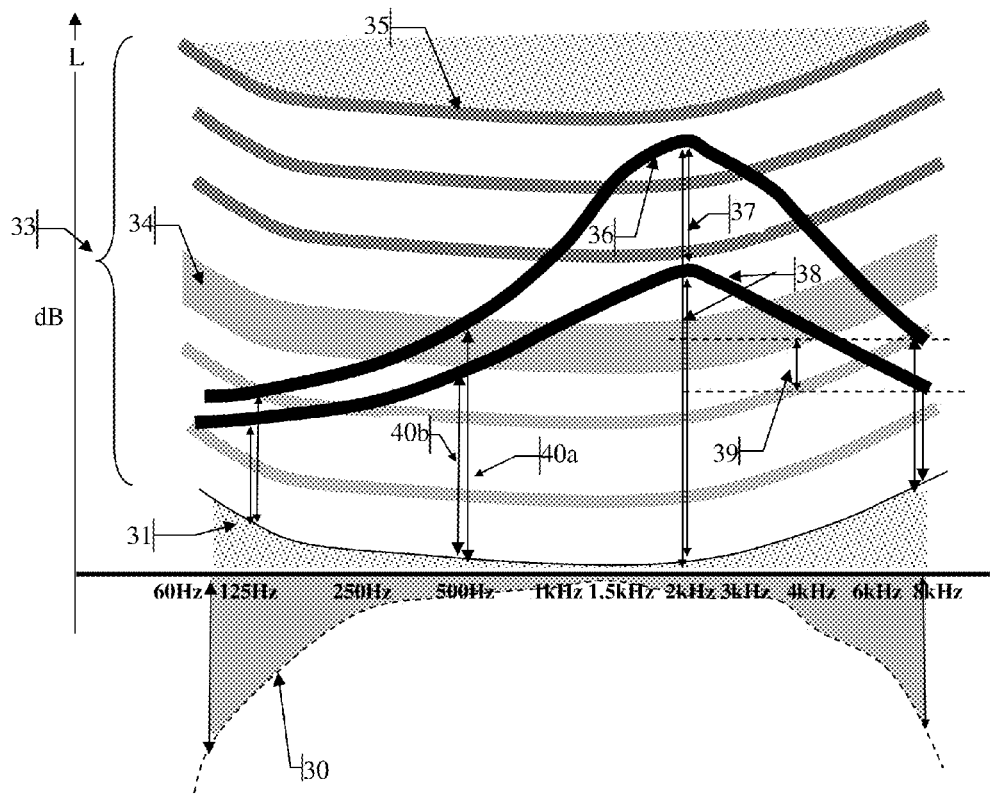
FIG. 3 illustrates the incidence of sound frequencies specific to a calling person around a mid-loudness hearing band of a hearing person. It also illustrates the "hearing correction" consisting of bringing the "hearing threshold" of a person to the level of a "normal" person, followed by adjusting his frequency sensitivity to the specific spectral distribution of the Caller's voice and adjusting his mid-level "comfortable" loudness level according to the average sound level of the Caller.

FIG. 3 illustrates the processing of the speech parameters of a caller, so as to adapt it to the hearing profile 33 of the recipient of the call and improve its intelligibility.

Although specific speech patterns enable speech recognition and speaker identification, the goal in this application is more limited; it is to make the call more intelligible to the hearer given his hearing limitations.

In our application, the speech processing of an incoming call consists of two stages. The first stage consists of bringing the "hearing threshold" 30 of a hearing impaired person to the level 31 of a "normal" person, at all relevant frequencies. This step is carried out irrespectively of the caller's speech characteristics. The prior art methods differ in adapting either a linear or a non-linear amplification of detected speech, with automatic gain control (AGC). Our method starts by requiring that the amplitudes of sound frequencies specific to a calling person be known either ahead of time or measured in the first instances of a call. The power distribution in the spectral domain is a good measure of speaker recognition.

Although each syllable and word has a different frequency distribution, the purpose in this rough classification of callers is to categorize people according to their different frequency vocalizations, roughly speaking, to differentiate between the "basses" and the "baritons" from the "tenors". Most of the callers do not have pronounced concentrations of frequencies around one frequency band nonetheless it is important from the call recipient's point of view to preferentially give more weight in amplifying the incoming calls to certain frequencies characteristic of the caller, while keeping the average loudness of the call around his "comfortable" level 34.

FIG. 3 also illustrates the characteristic spectral loudness distribution 36 of a caller, centered around 2 kHz. This distribution can be obtained by sampling the incoming speech at a low sampling rate of 16 kHz and filtering the samples with 8 filters that collectively determine the characteristic frequency distribution. The frequencies at the band around 2 kHz are very loud and close to being "offensive", while the loudness of frequencies at the band around 500 Hz are in the "comfortable" band 40a. The optimal processing of the caller's speech in this case is a non-linear compression of the loudness versus frequency distribution, such that the average loudness of incoming speech is brought to the average loudness "of the call recipient's" comfortable level and the range of loudnesses are reduced by a fixed percentage 37,38, 39 (from 40a to 40b), in this case by approximately 25%. The goal in this kind of correction is to limit the compression to the value that brings the dynamic range of loudnesses to the range that brings the caller's speech volume not to exceed the range between the "hear well" and the "loud" bands.

Figure 4:
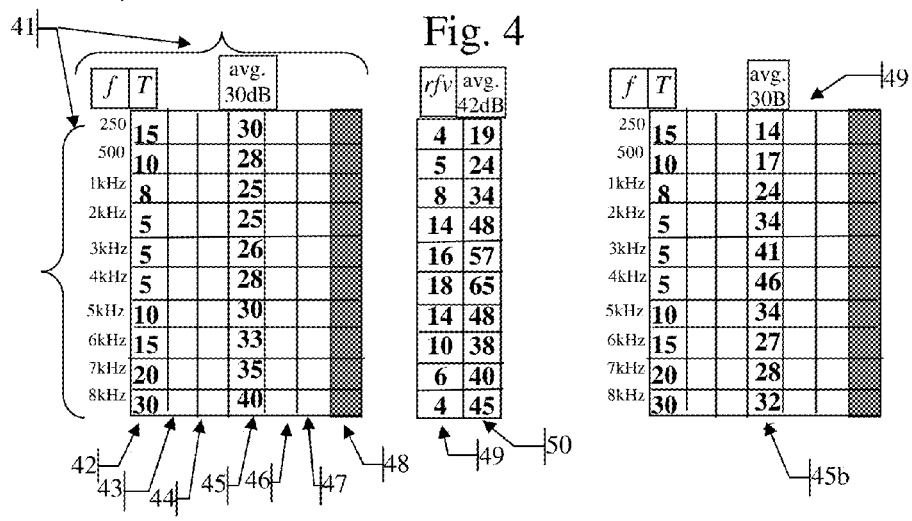
FIG. 4 illustrates the "Hearing correction" that comes to compensate for the hearing impairment of a person's ear in a matrix form.

FIG. 4 illustrates the amplification needed at frequencies of 250 Hz to 8 kHz for bringing the level of sounds heard by a hearing impaired person, to the threshold of hearing. The 7×10 matrix 41 shows the range of intensities that the hearing impaired person classifies as his "threshold" of hearing 42, "barely hear" 43, "hear well" 44, "comfortable" 45, "loud" 46, "too loud" 47 and "offensive" 48. Such a "hearing profile" matrix is different for each ear and as explained above, different depending on the location of the sound source.

The hearing threshold and the perceived loudnesses may be measured with a cellphone as explained above in conjunction with FIG. 2.

The "Hearing profile" matrices for each ear and sound source location, may be stored in diverse devices, such as telephones, cellphones and various databases; The "preferred" matrix may be used to correct the spectral intensities of communications between different subscribers, notwithstanding the mode of communications. The size of this "Hearing Profile" matrix is dependent on its practical usefulness and the economics of its implementation in devices that come to "correct" the hearing impediments of the users. The number of frequencies may extend from 5 channels in simple devices to 8 for most practical purposes, or even to 12-16 channels in elaborate applications. The loudness' levels considered is limited by the qualitative assessment of a person and usually limited to 6 levels where each level has a span of +5 dBs or more.

As the loudness levels are approximately equidistant, it is sufficient to express the shape and loudness level of the middle "comfortable" loudness band; the span of the loudnessess from the threshold of hearing to the maximal tolerable loudness being approximately double the distance from the hearing threshold level. Therefore the hearing loudness characteristic of a person may be described by the loudness of the comfortable level relative to the hearing threshold level, in 6 bits for each of the 10 fixed frequency bands.

The hearing loss of a person is expressed in his inability to hear and understand speech. While reduced hearing range may be improved jus by amplification of all sounds, this solution is not optimal from an SNR point of view. Consequently restoring the normal hearing loudness at frequencies that were impaired, by way of differential amplification, is much superior to straight amplification of all sounds.

Audio codecs sample the incoming speech power spectrum in the time domain and decompose voice samples into their frequency content, either with band-pass filters or by Discrete Fast Fourier transform or Discrete Wavelet transforms. To bring the sender's actual speech level to the heating impaired person's "comfortable" level, across all the frequencies, as listed in the "Hearing Profile" matrix, two operations are needed: the total needed amplifications consists in bringing the hearing level to the threshold of a normal person at all the frequencies and then amplify or reduce the loudness of incoming speech to fit a person's "comfortable" level A=A (T)+A(L)

The first operation is to bring the amplitudes of all frequencies to the level of a normal hearing person. In the "Hearing Profile" matrix, these are listed in the first column under "threshold of hearing" with SPL power levels, that compensate for the hearing loss as compared to a normal person. The second operation is to compute the ratio between the average power level 50 of the received speech sample and that of the "comfortable" level 45 of the hearing impaired person, and multiply the amplitudes of all the frequencies in the sample by said ratio, taking in account the relative average distribution 49 of said frequencies in the caller's voice. This operation will bring most frequencies amplitudes within the 3 middle, bands 44, 45, 46 without changing their relative amplitude, while the average amplitude of the call 45b remains mostly in the "comfortable" band of the recipient of the call. This equalization of the relative amplitudes of frequencies preserves the individual speech characteristics of the calling person, the way people sound and is superior to the non-linear amplification with AGC (Automatic Gain Control) used in the prior art.

The relevant "Hearing profile" matrices 41 can be stored on the cellphone where the audio codec and the microprocessor can perform the needed multiplications in real time before delivering the incoming call to the loudspeaker or earphones of the cellphone or landline telephone, which hopefully will have a larger bandwidth according to the G.722 standard in the future.

The intelligibility of incoming calls may be improved by giving more weight to the caller's specific speech characteristics as mentioned above in conjunction with FIG. 3. This is illustrated in a 2 column matrix where the relative frequency distribution characteristic to a caller, who apparently has a shrill, high pitched voice, is listed in a column 49 and the loudnesses at these frequencies are shown at the adjacent column 50. The amplification of the incoming call is accordingly weighted at the characteristic frequencies of this caller. The average volume of the call which originally was higher (42 dB) than the call recipient's "comfortable" hearing band (30 db) is attenuated by approximately 30% at all frequencies 45b. This procedure also improves the signal-to-Noise ratio of the call as compared to the previous art procedure where the amplification of the incoming call whether linear or non-linear is applied across the board to all frequencies.

In this case the "Hearing thresholds" 42 consisting in the amplifications needed at the frequencies of 250 Hz to 8 kHz, is accrued by ratio of the intensities between the "comfortable" loudness of the called party 45 and the characteristic "Voice Intonation" loudness 50 of the caller, concentrated in a narrower spectral bandwidth 49.

In general the Hearing thresholds 42 of both parties, are stored in a database and the corrections to be applied to the hearing mechanism of both parties are determined by taking the weighted average of the calling parties' voice amplitude with the "comfortable" loudness level of call recipient.

Figure 4A:
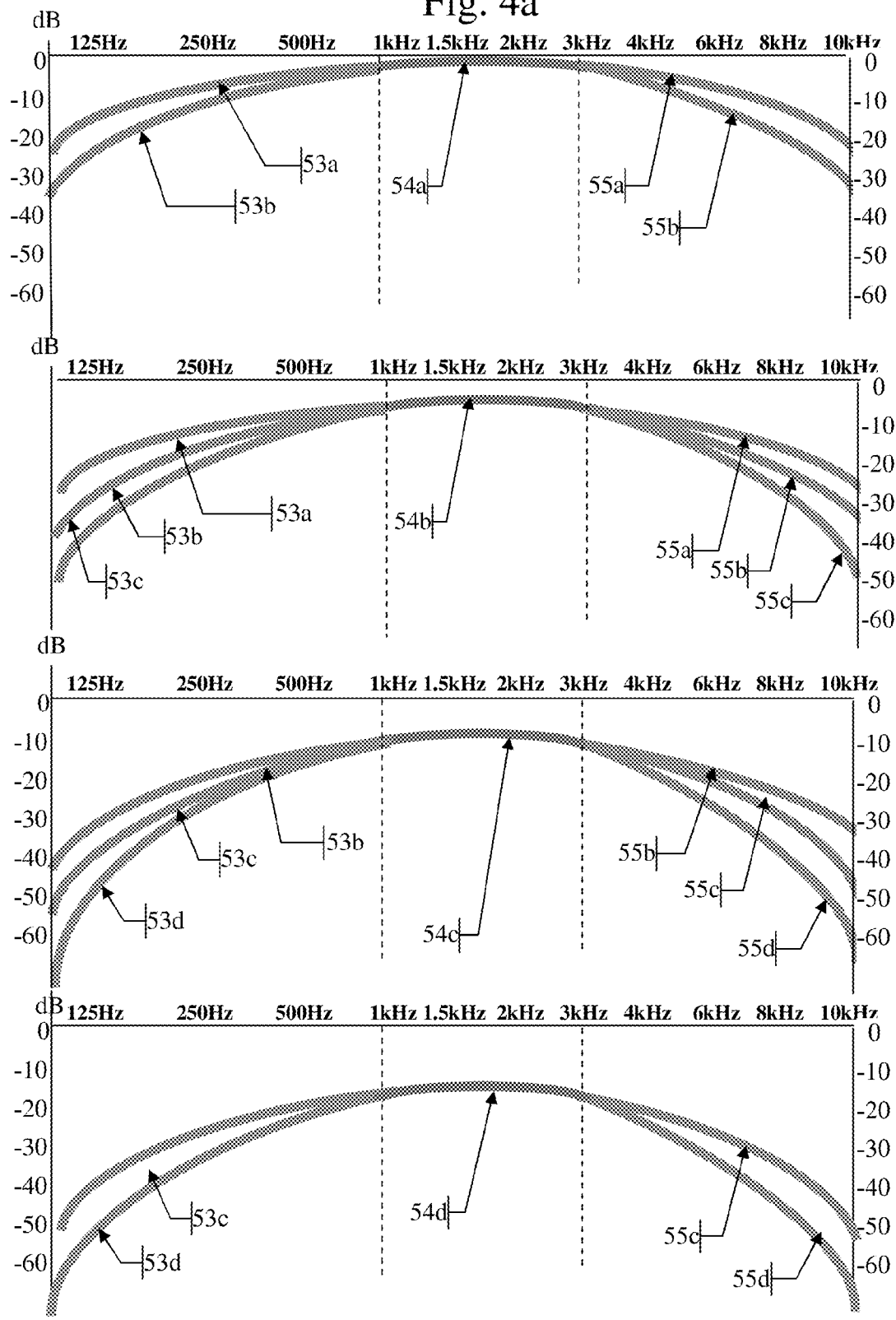
FIG. 4a illustrates the gamut of different hearing impairment characteristics and the possible classification of people in similarity groups

FIG. 4a illustrates the fact that, given the limited number of frequency bands and maximal loudness levels needed to specify the characteristic voice of a caller, combined with the "continuity" and "slow change" of the Loudness vs Frequency curves, there are only a limited number of different caller characteristics needed for classification of the different "Hearing profiles".

The "hearing impairment" curve has a banana shape, characterized by the gradual "narrowing" of the frequency bandwidth of hearing, with age. While the middle frequencies of 1 kHz to 3 kHz are less affected, the frequencies lower than 1 kHz and higher than 3 kHz, loose gradually their sensitivity. Thus the hearing threshold curve can be divided in 3 sections. The middle section 54a ranging from 1 kHz to 3 kHz is flat, with equal sensitivity; depending on the degree of hearing impairment; we can classify this section into 3 or 4 levels of hearing sensitivity, for example, a first level stretching from 0 to −5 dB 54a, a second level between −5 db to −10 db 54b, a third level between −11 dB and −18 dB 54c and a fourth level between −19 dB and −30 dB 54d.

The Low frequency hearing sensitivity has a "half-arch" shaped curvature starting at 1 khz and decreasing quadratically at decreasing frequencies down to 60 Hz. The low frequency section may be divided into 4 levels; a first level where the sensitivity decreases gradually by approximately 15 dB 53a, a second level where the sensitivity decreases approximately by 20 dB 53b, a third level where the sensitivity decreases by 25 db 53c and a fourth level where the sensitivity decreases by 35 dB 53d.

The high frequency sensitivity section also has a "half-arch" shaped curvature starting at 3 khz and decreasing quadratically or at a higher rate, at decreasing frequencies down to 10 kHz. The high frequency section may also be divided into 4 levels; a first level where the sensitivity decreases gradually by 15 dB 55a, a second level where the sensitivity decreases by 30 dB 55b, a third level where the sensitivity decreases by 40 dB 55c and a fourth level where the sensitivity decreases by 55 dB 55d.

Consequently the actual hearing threshold of anyone, is close to one of the possible combinations of the 3 "hearing sensitivity curves" delineated in the 3 sections above. The top box of FIG. 4a comprises 4 alternatives, (53a+54a+55a); (53a+54a+55b), (53b+54a+55a) and (53b+54a+55b). The reason behind this limitation is that when the central sensitivity curve (1 kHz to 3 kHz) doesn't show any hearing impairment, the sensitivity drop in the low and high frequencies is also gradual; we therefore limited the sensitivity drop to approximate 20 dB in 53a, 55a and to 30 dB in 53b, 55b.

In a similar form, the second and the third boxes illustrate 9 alternatives each. The fourth box illustrates 4 alternatives, due to the limitation of a hearing loss of 60 dB we imposed. In total we claim that any "Audiogram" measured in a Q&A session based on the patient's subjective answering, is very close to one of the 26 alternatives illustrated above.

The reasoning behind this simplification is that the "hearing sensitivity" tests are dependent on the subjective answering of the patients and have large latitudes; the answers have probably an error range of ±5-7 dB. The other reasoning behind this simplification is that the loudness tests that patients undertake in which they classify their loudness perception into 5-6 classes are also subjective and have an error range greater than ±5-7 dB. Thus the needed speech amplification based on the "Hearing threshold" that might have an error of ±5-7 dB is entirely within the error range of the loudness perceptions of the hearing impaired person.

A more precise way to define this is that the distances between the different "Hearing Thresholds", "Loudness Bands" and "Voice Intonation" $D_T$, $D_L$, and $D_V$ in SPLdB units, in the frequency domain, between the data elements (i) and the next level (i+1) in the 3 Tables, in the "loudness vs frequency" domain, defined as $D_T=\Sigma_f(T_A)_i-(T_A)_{i+1}$; $D_L=\Sigma_f(L_A)_i-(L_A)_{i+1}$;

$D_V=\Sigma_f(V_A)_i-(V_A)_{i+1}$ are of the same magnitude as are the indeterminacies in measuring said data in practice, and is of the order of ±5-7 dB.

Obviously the "hearing threshold" of the right ear is different from that of the left ear.

The personal "Hearing Profiles" may be associated with a person, notwithstanding which telephone he might be using to take a call. Such "Hearing profiles" may be stored in the telephone box or in the cellphone and applied to correct an incoming call. They may also be stored in proxy servers in Getaways and used to "correct" the internet voice traffic of subscribers to the service.

As the personal "Hearing Profile" may be self measured by remote, in a Q&A session in complete privacy, the adaptation of incoming calls to the recipient's hearing profile as well as to the caller's characteristic voice, can be fully automated.

Figure 4B:
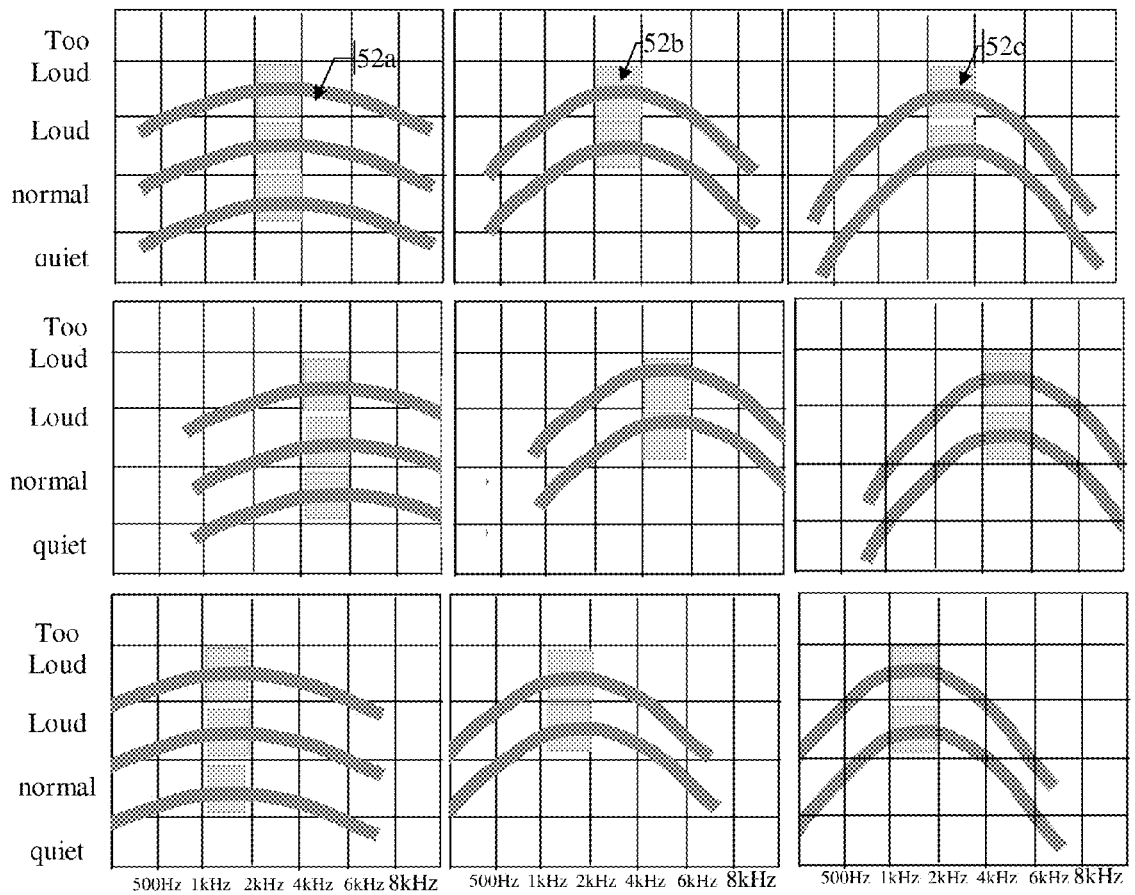
FIG. 4b illustrates the classification of speech articulation characteristics in "similarity" groups.

FIG. 4b illustrates the different loudnesses and possible voice intonations of callers in order to classify them in different groups. In a phone call, people talk most of the time normally; however their normal voice may be louder, the same or quiter than the call recipients' "comfortable" level of loudness. Their characteristic maximal frequencies are mostly either in the 1-2 kHz, 2-4 kHz or 4-6 kHz ranges 51x; the frequency distributions of their voices are either flat or decrease slowly 52a around a maximal frequency, change moderately 52b or change faster 52b around their maximal frequencies. Although based on the above classification, there may be (3×3×3)=27 different voice intonation characteristics, some of them are not realistic; when the maximal loudness is in the quiet band, other than the flat frequency change is not realistic. Therefore the loudness vs frequency classification has only 21 different types.

This classification enables to attribute to anyone's "frequent callers" one of the characteristics that defines this person's voice intonations; consequently the frequencies specific to a caller may be amplified or attenuated differentially, while bringing the average loudness to the "comfortable" loudness level of the hearing impaired person. This differential adjustment of the amplification reduces the relative "noise" component at the entire call and consequently improves intelligibility.

Figure 4C:
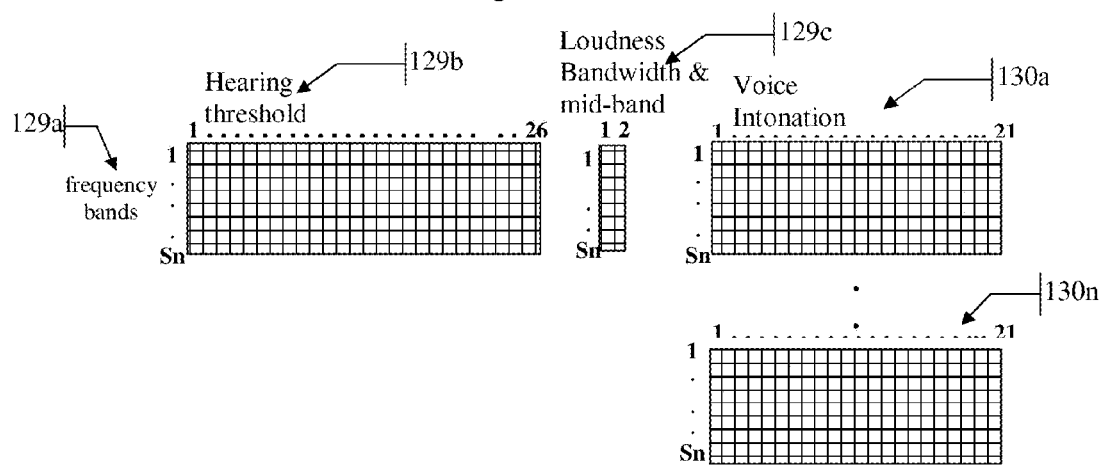
FIG. 4c illustrates the various possibilities of hearing impairment and speech articulation characteristics in a tabular form

FIG. 4c illustrates the various possibilities in a tabular form as shown above in conjunction with FIGS. 4a and 4b. The "Hearing threshold" as a function of frequencies is shown to have 26 versions 129b. The audio spectral bandwidth defined by the ITU G.722 extends from 50 Hz to 7 kHz, although from the speech intelligibility point of view it is sufficient to assess the hearing threshold from 250 Hz to 7 kHz. If $S_n=8$ the spectral bands may comprise the bands (250 Hz-500 Hz); (0.5 kHz-1 kHz); (1 kHz-2 kHz); (2 kHz-3 kHz); (3 kHz-4 kHz); (4 kHz-5 kHz); (5 kHz-6 kHz); (6 kHz-7 kHz). Each hearing threshold version is associated with a "Hearing loudness bandwidth 129c 1 and the location of the "Comfortable" level 129c 2.

The "Voice Intonation" 130a of a person as a function of frequency also has 21 possibilities. But as the Voice Intonation characteristics are strongly correlated with linguistic pronunciations, there are a multiplicity of such tables 130a to 130n. What we mean is that western English has different speech intonations than Japanese, Chinese or Arabic. consequently there may be different "Voice Intonation" tables for different languages.

The above process may be generalized by stating that there are 3 factors to consider when trying to optimize the processing of speech before relaying it to the ear:

1—the "Hearing Thresholds" table with elements $(A_T)_i$ in the frequency domain, 2—the "Hearing Loudness" table with elements $(A_L)_j$ representing the bandwidth of Loudness extending from the "Hearing threshold" up to a "maximal tolerable Loudness" level in the frequency domain where the mid level of loudness is denoted as the "Comfortable level and 3—the "Voice Intonation" table representing the distribution of the voice articulation loudnesses in the frequency domain Given these 3 tables, the amplification or attenuation (A) of the sound received from the network is given by $$A=A(T)+A(L)=[A_{TC}]_T+(A_{LC})_m]*(A_V)_n[\Sigma_S(A_V)_n/\Sigma_S(A_{TC}+A_{LC})_k]$$

namely the amplification needed to close the gap of the hearing impaired A(T) augmented by the loudness of the incoming speech A($_V$), moderated to bring its average level (in the frequency domain) to that of the "comfortable" level A$_{LC}$ As mentioned above the indeterminacy in measuring an audiogram or the "Voice Intonation" characteristics is quite large. Consequently the gamut of different variations and possibilities is finite. Consequently if the list of all possible variations is accessible, the measured actual data may be compared with the list of possibilities and a "closeness" check may be performed. Closeness in any one of the 3 characteristics may be defined by the cumulative distances in the frequency domain, $D_T = \Sigma_f (T_A)_m - (T_A)_p$; $D_L = \Sigma_f (L_A)_m - (L_A)_p$; $D_V = \Sigma_f (V_A)_m - (V_A)_p$ where at each frequency band the distance could be of the order of ±5 dB and the cumulative distances in the frequency domain less than [5N$_f$]dB.

Once the closest or several close versions are found the Audiogram test and the "Voice Intonation" measurement may be repeated in order to find whether the "gap" between the actual measurement and the predefined versions may be bridged, as the electronic implementation of the predefined version may already be available.

On the other hand, if the measured characteristics are not within the "distance" as defined above, they may be stored in an additional "provisional" database and when sufficient "repeat" measurements are accumulated, the original database may be enlarged to include the additional characteristics. This process both validates the assumption that there are only a limited number of variations of the Hearing and Intonation characteristics and gradually builds an improved real-life database of said characteristics.

In this context it is worthwhile to mention that gigantic numbers of Audiograms stored in audiology clinics may also be compared, with their owners consents, to the universal database elements we propose. As mentioned above comparing these real-life audiograms to the predefined ones may find distributions of characteristic loudnesses in the frequency domain that are not "close" to the predefined ones in the database we propose. These characteristics may be added to the database, thus enlarging its scope.

The hearing corrections explained above relate to one of the ears as both the "hearing threshold", the "loudness bandwidth" and the loudness of the "Comfortable" level are different from one ear to another. Consequently for people that want to use either ear to take a call or for people wishing to take a call with earphones plugged to both ears, or as illustrated below in FIG. 12 for people that want to use both ears using "sound beams" focused to each ear separately, the incoming call may be corrected at the end of the communication route at the level of the phone, as illustrated in FIG. 10a. The incoming call exiting the cellphone's CODEC to the earphone output 112 may be diverted to 2 separate equalizers 119a and 119b controlled by a microprocessor 120 residing on the back-case of the cell-phone.

Figure 5:
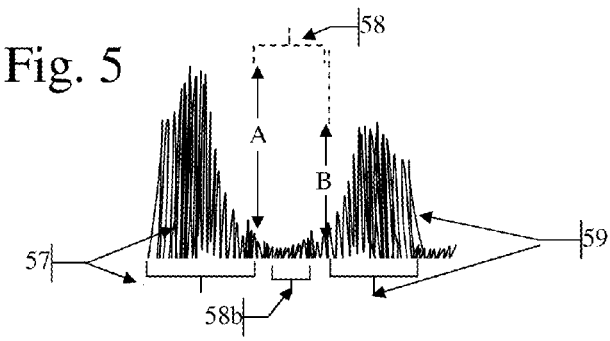
FIG. 5 illustrates the sound pressure waves generated by a talking person including the interval between syllables.

FIG. 5 illustrates the energy distribution in the time domain of a word comprising two syllables with a quiet period in-between. It has to be realized that "Speech" is intermittent while "noise" is generally continuous, although it may be time variable; speech comes in staccato, in discrete syllables 57, 59 and words, while "Noise" 58 is generally continuous and of lesser amplitude.

Voice transmissions are in general cleaned of continuous "noise" situated between speech segments as a way to increase transmission efficiency. However discrete words may still contain "noise", included in the intervals between the syllables constituting the word. Such intervals may have minimal durations of tens of milliseconds and contain "noise" where their spectral components are uncorrelated with those of the following syllable; consequently subtracting them from the following syllable will improve the SNR of the syllable.

Figure 5A:
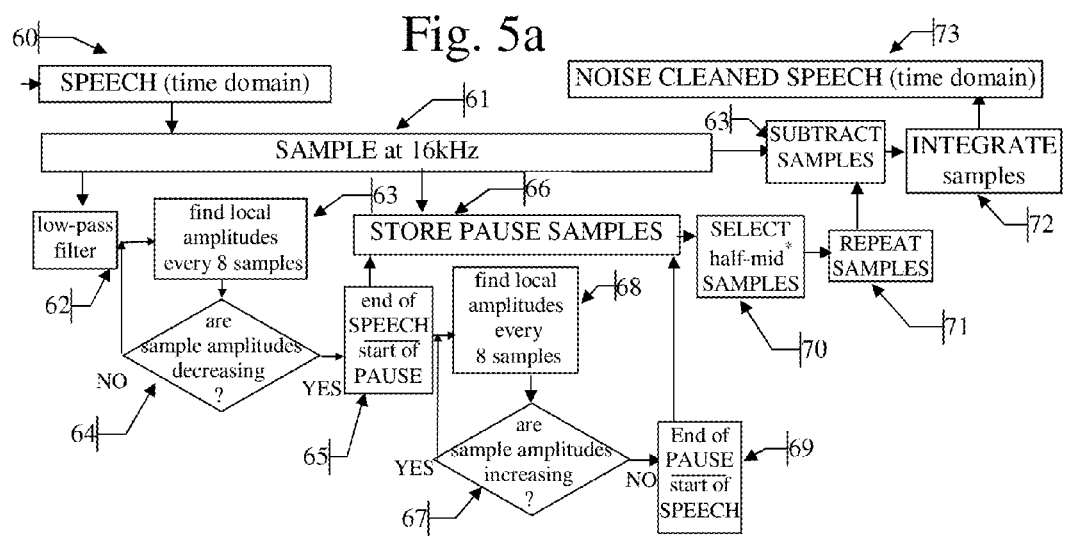
FIG. 5a is a block diagram depicting the process of determining the quiet periods between syllables and subtracting the signals detected during said quiet period, from the signals detected from the streaming speech in the time domain.

FIG. 5a illustrates a simple method of eliminating noise interspersed in streaming speech. In general any detected signals during the interval between syllables do not contribute to the intelligibility of the entire multi-syllable word and may be assumed to be "noise" without further examining their spectral content. Subtracting the inter-syllable signals from the entire word, adjusted for the duration of said signals, will therefore also reduce such "noise" riding on the syllable signals in the time domain.

The speech signal in the time domain 60 may be sampled at 16 kHz 61 and after integrating each 8 samples with a low pass filter 62, the amplitudes of the integrated train of samples are recorded 63 in order to find the descending slope of a syllable where the amplitudes keep decreasing 64. When the amplitudes of the integrated samples stay more or less the same, this indicates the end of the speech syllable and the beginning of an interval 65. When the amplitudes of the integrated samples start increasing, this is an indication of the start of the second syllable and the end of the interval 67, 69. In order to select sound samples truly representative of the activity in the inter-syllable interval, we take only the samples in the mid section of the interval 70, 58b and repeat and extend them in the time domain 71 to the extent needed for subtracting them 63 from the samples representing the second syllable. Integrating these samples in the time domain 72 gives the amplitude of the signal cleaned from noise 73. The subtraction process may be continued beyond the two-syllable word, assuming that "noise" doesn't change fast. The process of finding the "noise" component may be repeated from time to time, say every 30 seconds, in order to find a more recent "noise" component.

Figure 5B:
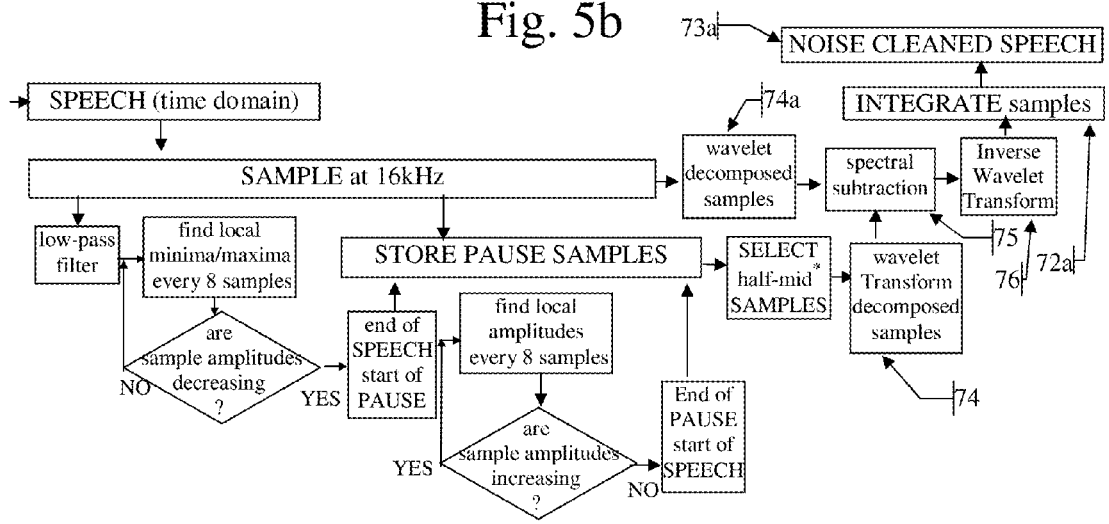
FIG. 5b is a block diagram of the process of determining the quiet period between syllables and subtracting the spectral components detected during the quiet period from the spectral composition of the following syllable's speech signals.

FIG. 5b illustrates a method of eliminating noise interspersed in streaming speech more accurate than the processes described above in conjunction with FIG. 5a. While the quiet interval between two syllables is detected in the same process as above, the speech samples residing in the middle of the interval are decomposed into the frequency domain using a discrete wavelet transform (DWT) 74a. The wavelet decomposition better separates the speech frequency bands from the frequency bands due to the background noise. After the DWT, the frequency bands of the samples from the interval are subtracted 75 from the speech samples of the following second syllable after they too are decomposed into their frequency elements using a discrete wavelet transform. The denoised speech is then reconstructed by using an inverse Wavelet Transform 76. The integrated samples 72a then restore the speech signals in the time domain 73a.

Figure 6:
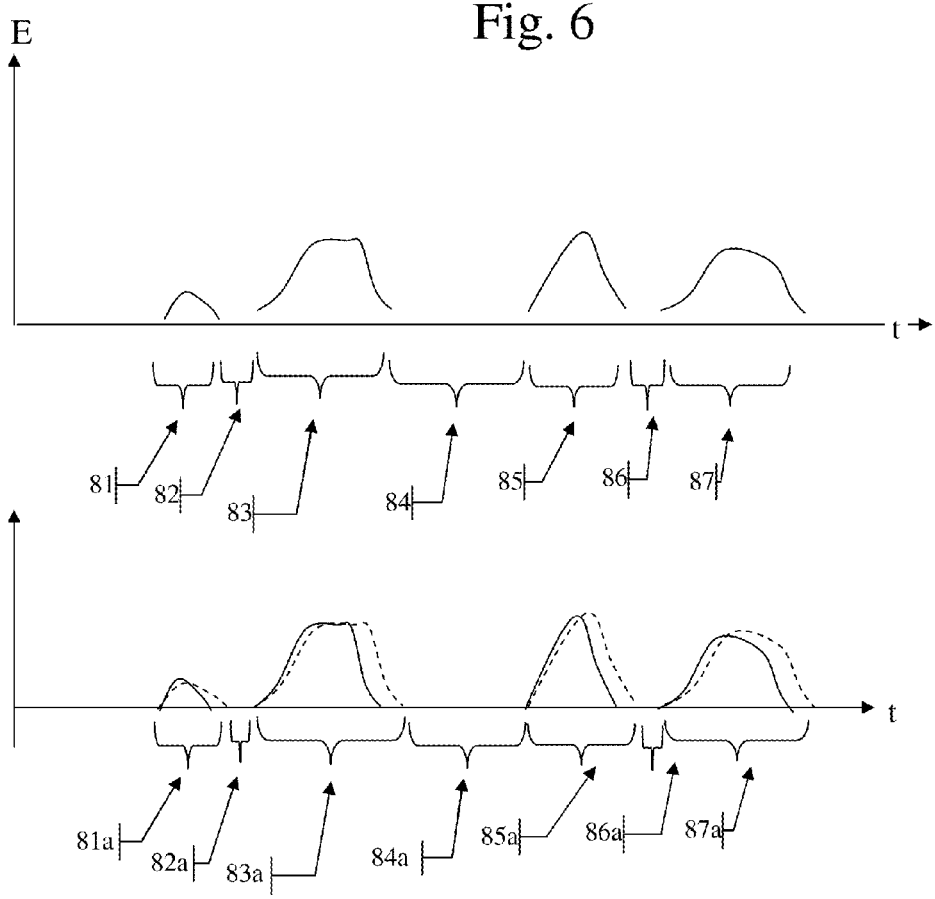
FIG. 6 illustrates the amplification of the energy of phonemes and syllables by dilating them in time on the account of "intervals" between said phonemes and syllables.

FIG. 6 illustrates the amplification of phonemes and syllables by dilating them in time on the account of "intervals" between said phonemes and syllables. As speech is composed of words and words are composed of syllables and phonemes, with silence intervals between them, it is possible to improve speech intelligibility by moderately expanding the time duration of syllables and phonemes on account of the "interval" durations that come after them. For example a two syllable word of 200 millisecond duration may originally be composed of 2 syllables each of 75 msec and a interval in between of 50 msec. In such a case, if each of the syllables were time-dilated, say by 10%, and the interval in between the syllables reduced proportionally, the intelligibility of the word would improve, as this "dilation" is equivalent to "amplification". The sound wave propagating in the fluid in the inner ear canals, "move" the hairy filaments for a longer time, which in turn when stimulated "fire" for a longer time. This effect may also be non-linear, like in all mechanical systems, where moving from a stationary state to movement, takes more energy than when accelerating a mechanical system that is already moving. Consequently "dilating" a phoneme may provide the extra energy that is needed to "start" the hairy filaments moving.

Reducing moderately the time interval between syllables, while keeping the same average tempo of words does not change much the speech characteristics of a person while the additional amplification provided without boosting loudness, greatly helps intelligibility.

FIG. 6 illustrates this process, in the case of two words with a interval 84 in-between, where the speech amplitudes are squared to obtain the energy distribution in the time domain and integrated with a low-pass filter. Each word is composed of two syllables, 81, 83 and 85, 87 with intervals 82 and 86 between the respective syllables. The dilation of the syllables is illustrated by increasing the width of the syllables 81a, 83a, 85a and 87a, which respectively reduces the length of the intervals 82a, 84a, 86a automatically. The original length of syllables are determined in the same process as described above in conjunction with FIG. 5, by sampling the energy distribution and determining its rising and falling slopes. The dilation is accomplished by increasing the sample widths when integrating the samples to obtain the speech energy in the time domain.

Figure 7:
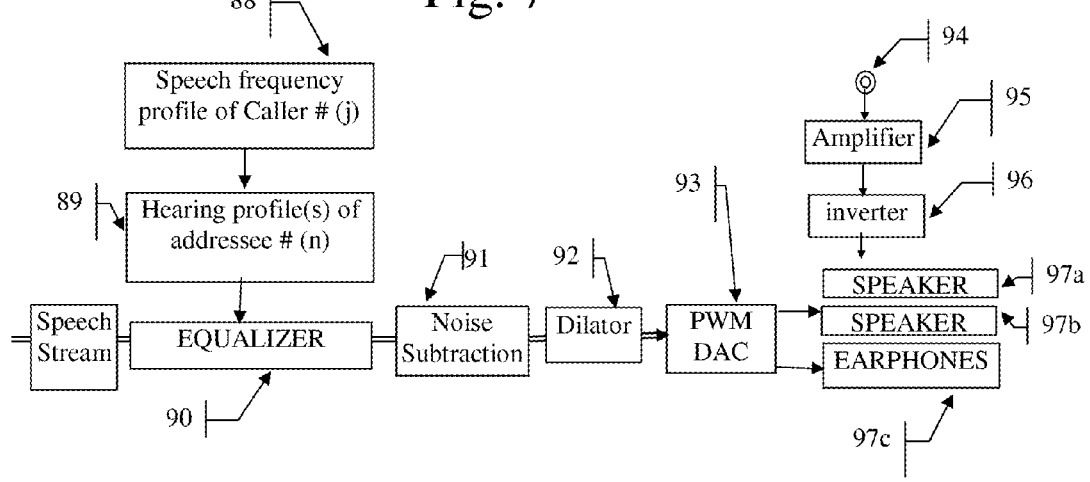
FIG. 7 illustrates all the elements that come to "improve" the speech intelligibility of voice calls.

FIG. 7 illustrates the different functional blocks that come to "improve" the Hearing ability of a person and intelligibility of speech heard, directly with a hearing-aid device or through a communication device. The major improvement is due following the assessment of the Hearing Profile of the person 89 and the correction of the sound channeled to the ear by adequate amplification of the volume of the sound at the different frequencies. This can be done by an equalizer 90. Fine-tuning the amplification at the different frequencies as a function of the caller's voice characteristics may further increase the signal-to-noise ratio by selectively amplifying only certain frequencies. To this end, the voice characteristics of the caller 88 has to be assessed either ahead of time (by establishing a list of "Frequent Callers") or at the beginning of the conversation. As mentioned above, there are a limited number of corrections that cover the gamut of frequencies and needed amplifications and each variance of them may be carried out by one preset equalizer. Thus given a large bank of preset equalizers, improving the intelligibility of a call between two persons, comes to diverting the call through one preset equalizer in one direction and a second preset equalizer in the opposite direction. Of course the needed corrections can also be stored at the edge of the communication network at the specific cell-phone or landline POTS; however centralizing the corrections in one or several servers linked to the communication networks is more efficient and doesn't require to adapt the application to a plethora of cellphones and videophones.

Figure 8:
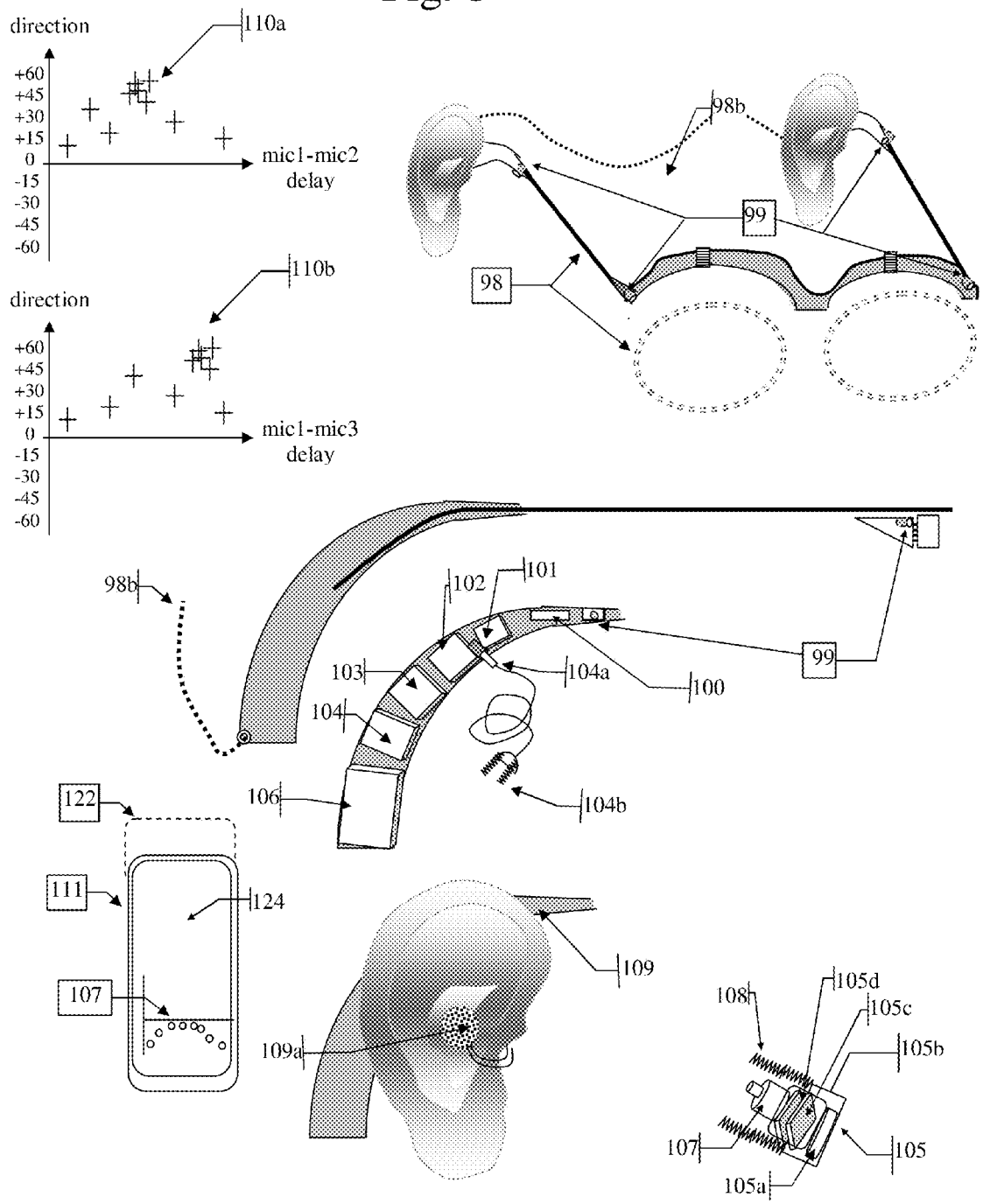
FIG. 8 illustrates a pair of eyeglasses carrying Hearing correction electronics in its bows, and earpieces where the "Hearing profile" is measured interactively with the cellphone.

Noise is the major factor that impacts the intelligibility of received speech whether directly or through the communication networks. Noise 91 can be reduced in several ways; either as described above in conjunction with FIGS. 5a and 5b, by subtracting the signals detected in "interval" periods from the following speech segments or by limiting the spatial area from which sounds are accepted for processing. As illustrated in FIG. 8 noise can also may significantly be reduced by a "beamforming" technique consisting of 4 microphones 99 that may be placed on eyeglasses and serve to assess the direction of sound by measuring the time delays between the microphones. Thus sounds arriving from directions other than the interlocutor may be eliminated from transfer to the speaker that feeds incoming speech to the ear. This can be achieved by adding the outputs of the microphones in the time domain, with proper delays stemming out of the direction; in this case the amplitude of the speech will be cumulative while noise will spread out in the time domain. Obviously speech and noise coming from the same direction cannot be separated by this technique. The noise subtraction 91 is done after the "corrections" in the frequency domain effected by the equalizer. The "dilation" of speech 92 is preferably be done on "clean" speech after noise elimination. From there, the "corrected", "noise cleaned" and "dilated" speech is sent through a Digital to Analog converter 93 and using pulse width modulation (PWM) to a loudspeaker 97a that delivers the processed speech to the ear. It has to be realized that noise and unprocessed speech also reach the ear through the air, unless they are actively eliminated. This can be achieved by detecting incoming speech with a microphone 94 near the ear and after amplifying it 95 and reversing its phase 96, delivering it to the ear canal through a second speaker 97b.

FIG. 8 illustrates a pair of eyeglasses 98 that working with a cellphone 111 improves the hearing quality of speech, whether directly or through the cellphone. The electronic circuits processing the sounds detected by 4 microphones 99 are embedded in the earpieces at the back of its bows. The electronic components embedded in the two earpieces may intercommunicate using a flexible chain-like thin waveguide 98b. This interconnection is important in order to correlate the signals detected by the microphones embedded in one bow with those in the other bow. The cellphone working interactively with the eyeglasses wearing person, determines the hearing profile 107 of the person at both ears, as mentioned above; it may also have a back insert 122 comprising an additional speaker 124 as explained below in conjunction with FIG. 9. The software application that helps determine the "Hearing profile" may be embedded in any cellphone 111. The "Hearing profile" determined by the cellphone may be transmitted to the audio processor 101 embedded in the bow of the eyeglasses, through the bluetooth transceiver 102 and the microcontroller 103. The audio processor 101 has an "equalizer" that implements the "Hearing correction". Alternatively if the Hearing profile of the user is close a predefined one, a preset equalizer may be used. The corrected signal is then transmitted to the DAC of the microcontroller 103. The analog signal is then relayed to an earphone speaker 104 with an external extension 104a pluggable to the ear 109a of the user with a foamy adapter 104b. Alternatively a stand-alone high efficiency wireless earphone 105 may be used. A Near Field transmitter 102 on the bow, may transmit the signal to the NFC receiver 105c through an antenna 105b; the digital signal may then be converted to analog by an ADC 105d and fed to high efficiency balanced armature speaker used to determine the hearing profile 107. The stand-alone earphone also contains a small 6 mm battery 105a and has a foamy surface 108 and can be plugged onto the ear canal.

The bows of the eyeglasses contain a digital signal processor (DSP) 104 that processes the sound signals detected by the microphones for denoising them, the way explained in conjunction with FIGS. 5a, 5b consisting in finding the speech intervals between syllables and subtracting the signals detected during said intervals from the following syllables signals.

Each of the earpieces 109 is in principle an autonomous hearing aid. They can be separated from the bow of the eyeglasses and inserted onto a different set of eyeglasses that have the same geometry at the connection region; for example the bows may be of the wire type. The earpieces may also be appended behind-the-ear and serve as stand alone hearing aids. In this kind of application the weight of the earpiece is evenly distributed notwithstanding its shape, in order to better balance it behind the ear.

Finding the direction of speech is a powerful tool that enables to select only speech coming from the desired direction. The direction of sound source from the 4 microphones on the eyeglasses bows is in principle a function of the distance of said source. The sound waves reach the 4 digital microphones 99 embedded on the bows of the eyeglasses, at time delays of 0 to 350 μsec, each from the other and at slightly different intensities. Therefore extracting the direction of speech without resorting to heroic computing efforts is not simple. The method used consists in moving to the frequency domain by filtering the outputs of all the microphones with one narrow band pass filter around 4-5 kHz thus increasing the speech-to-noise ratio. The second step is finding the most probable direction of speech by a method that is in principle like cross-correlations, but simpler to execute. This consists in extracting from a Look-up table that gives the 6 time delays between the 4 microphones as a function of a given direction and assuming a distance from the interlocutor of 4-5 feet, and check for time coincidences between the microphones around these time delays. As illustrated in FIG. 8 110a, 110b, speech coming from the selected direction will cause more coincidences around the optimal delay. Adding the 6 properly delayed coincidence results will reinforce the correlation between the direction of speech and the calculated delays. The third step is to delay the outputs of the 4 microphones by the optimal delays stemming from the selected direction, thus reinforcing speech and attenuating non correlated noise.

The direction may be selected using the touch or tap sensors on the bows of the eyeglasses and the selected direction may be confirmed by short audio messages. In cases where the source of speech is visible, for example on a one-to-one conversation, where the talking person is in front of the eyeglasses wearer, the second step mentioned above, of confirming the delays as a function of the direction, may be omitted and the properly delayed speech components may be added and relayed for further processing or sent directly to the speaker.

The combined speech may further be processed, for example in order to subtract noise elements detected during intervals between syllables as explained in connection with FIGS. 5, 5a and 5b.

The syllable dilation is executed by finding the syllable duration in the time domain using the DSP 103 and expanding it using the PWM of the DAC in the audio processor 101.

A rechargeable lithium Polymer battery 106 situated at the end of the bow is replaceable and may be changed by the user when needed.

Figure 9:
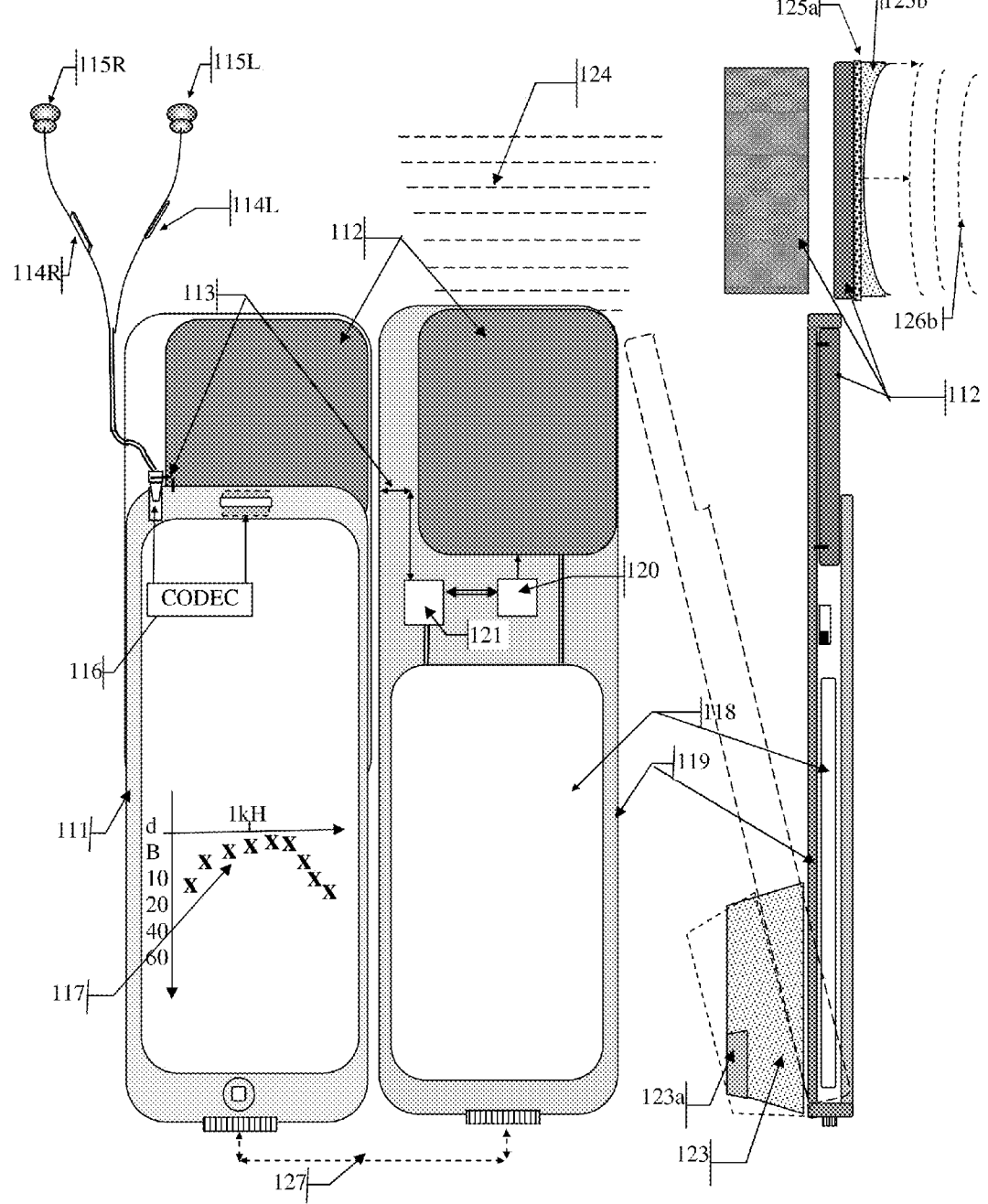
FIG. 9 illustrates a cellphone docking accessory, incorporating an equalizer that implements the necessary "hearing correction" externally and enables to receive "corrected" calls either through earphones or through an external focusing speaker.

FIG. 9 illustrates a cellphone 111 with a back-case 112 clinching to it from 3 sides; the back-case carries at its top a flat plane speaker 112 of higher power and larger bandwidth than the internal speaker of the cellphone. The speaker 112 emits plane waves 124 and consequently has less dispersion as compared with a regular cone type speaker. A plastic lens 125b curved in two dimensions helps focus the plane waves. The plastic lens has to be juxtaposed to the vibrating surface of the speaker with a highly viscous, non-absorptive, thin film 125a in order to minimize reflections. The focusing of the plane sound waves is beneficial as the sound then reaches farther distances with minimal dispersion. Thus a cellphone placed on a desktop and directed towards the ear of the person behind the desk, will direct the voice emanating from the focused speaker, with minimal spreading-out of the sound.

Effective focusing is also important for directing the sound to the specific ear desired by the user. FIG. 9 also illustrates a flap 123 attached to the back of the case 119 enclosing the cellphone from 3 sides, so that when said flap is opened, it supports the case in an inclined position; two smaller flaps 123a placed perpendicular to the main flap 123, when opened, help stabilize the whole structure in an inclined position. The case 119 holds the cellphone 111 from 3 sides and holds in addition to the flat speaker also a thin battery 118, an audio processor 121 and a microcontroller 120. The audio processor features an equalizer and connects to the earphones output 113 of the cellphone. In this way sounds generated by the cellphone, whether music or voice calls, are also connected to the audio processor 119 and after being equalized are emitted by the speaker 112 or the earphones. The earphones output is stereophonic and have right and left buds 115L and 115R with separate amplification attenuators 114R and 114L. Similarly the Audio Processor 121 is also stereophonic and includes two equalizers one for the right ear and one for the left ear. As the hearing profile of the ears are usually different, the respective hearing corrections are different too. Consequently when the incoming call is channeled to the external speaker, a selection has to be made whether to broadcast the right-ear corrected version or the left-ear corrected one and direct the focused sound beam in the proper direction.

The back-case 119 carries a battery 118, that also serves as a back-up battery for the cellphone. The back-case is also connected to the cellphone's USB port 127 so that the audio output of the cellphone's codec, may also be connected to the external speaker.

The cellphone may also include an internal software equalizer application, that is suitable for correcting the hearing loss, if access to the cellphone's codec 116 is allowed by the manufacturer. In this case the output of the software equalizer corrected codec output may be directed to the flat plane speaker.

The external equalizer bands also may be set using the cellphone's keypad and relayed to said equalizer through the cellphone's USB port.

Consequently the "hearing thresholds" of the ears, when the voice source is at a distance, may be measured with the external speaker which has a wider bandwidth and is louder.

After the "Hearing threshold" is established, it may be displayed 117 on the cellphone's screen.

Figure 10:
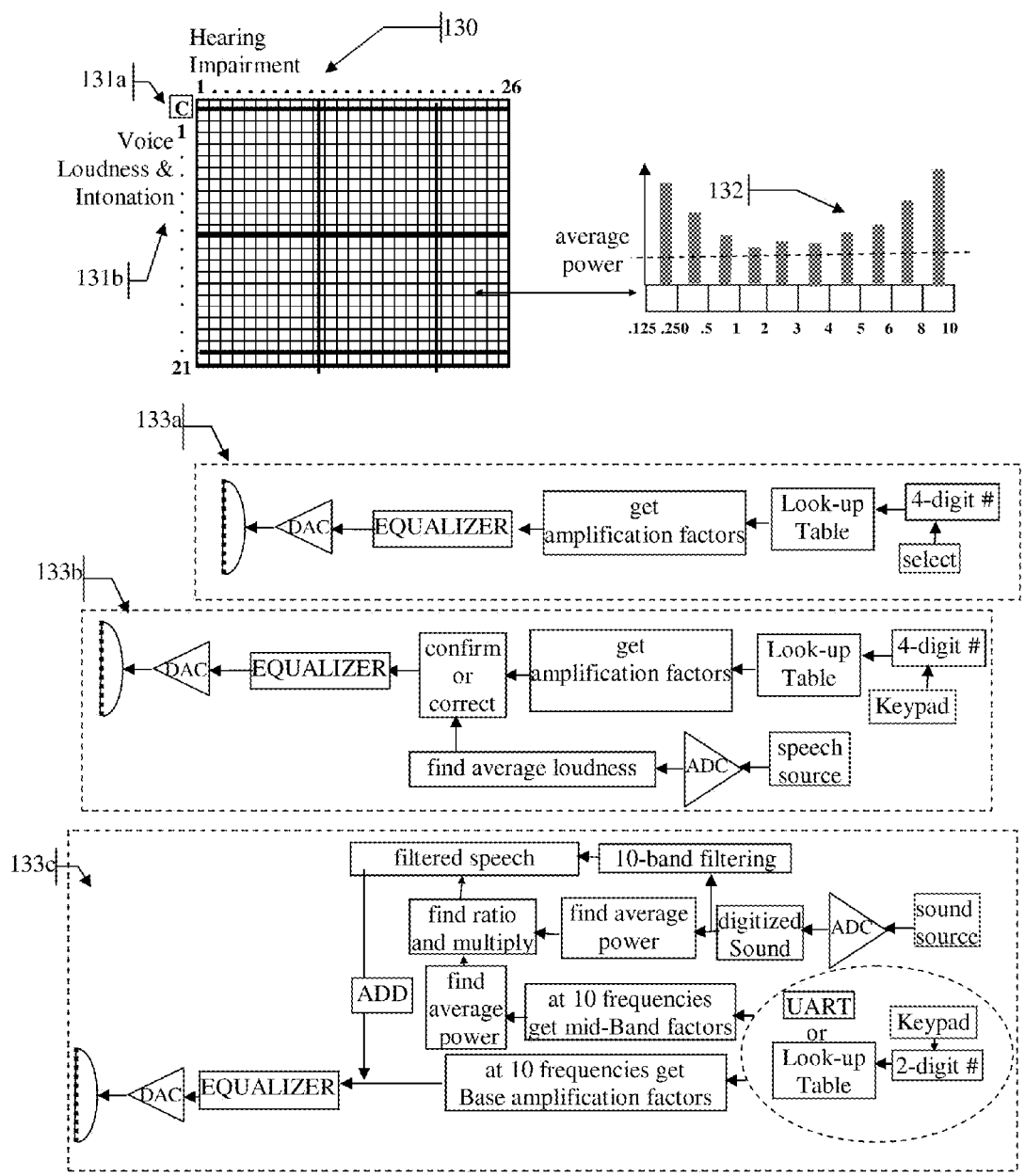
FIG. 10 illustrates the different "Hearing correction" codes available on databases stored in proxy servers in the Internet Gateways and the way to correct calls between the communicating parties.
Figure 10A:
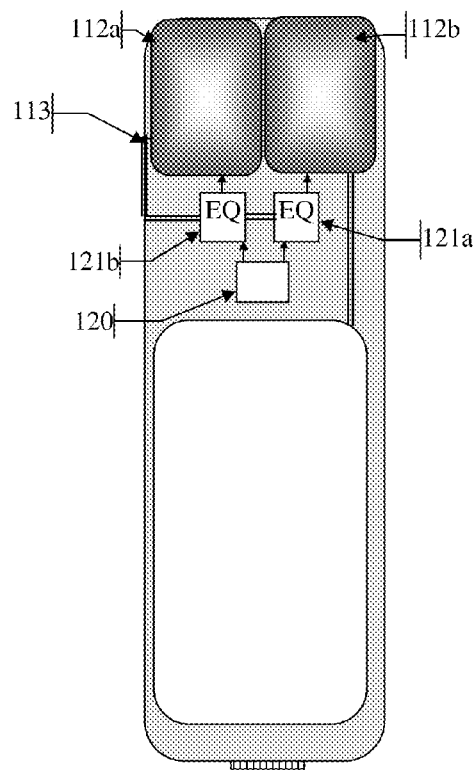
FIG. 10a illustrates a back-case of a cellphone that carries two speakers able to substantially focus the emitted sound for a short distance in the direction of the user's ears.

FIG. 10 illustrates the "Hearing Correction" data available on databases stored in proxy servers in the Internet Gateways. All possible "Correction" tables explained above in conjunction with FIGS. 4, 4a 4b and 4c, in a conversation between two people, may be summarized in a large (26×23) matrix that combines the various types of corrections needed due to "Hearing threshold" and the preferred levels of hearing loudness levels 130 of one party, versus the "Voice Intonation" characteristics 131 of the other party, with the understanding that this matrix has a third spectral dimension. The concept of limited number of corrections stems from the practical fact that the "uncertainty" in assessment of the degrees of Hearing or Voice Intonations is, quite large, as assessed in all subjective Hearing tests. Consequently, the ensued amplifications or attenuations with an error range of ±5 dB, aren't material, neither in the Intelligibility of speech, nor in the "comfort" loudness level. The matrix illustrates 26 different "Hearing Thresholds", the hearing loudness bandwidth and its mid level "C", associated with each "Hearing Threshold" and 21 different "Voice Intonations" categories. As the hearing characteristics and the "Comfort" loudness for each ear are in general different and the parties to a conversation have different "Hearing" and "Voice Intonation" characteristics, there are according to this classification 2(21+2)(26)=1196 parameters that define the intelligibility of a conversation between both parties, assuming each party is using one ear. Obviously in practice, not all possibilities have the same probability of occurrence; some may have higher and some much lower probabilities. In all cases however a person's conversational characteristics in both ears, may be summarized by a 4 digit number, one out of the 1196 possibilities.

It is important to realize however, that once these personal characteristics are set, it all comes to setting the loudness levels at the different frequency bands of the sound relayed to the ear. Technologically it comes to setting the loudness levels of the frequency bands of an "equalizer" 132. At the personal device level, whether this is a cellphone, a hearing-aid or any sound emitting device, it all comes to passing the received speech through an equalizer preset according to the parties combined Hearing impairment and Voice intonation characteristics. When the characteristic 4 digit codes of the parties are known in advance, the corrections can be done automatically 133a at the Gateways of the communication networks, by just looking at the Look-up table and directing the call to the proper preset equalizer. It is proper however to check 133b the loudness of the incoming call and ensure that it conforms to the last 2 digits of the code.

Making the "corrections" on the communication network instead of making them on the user's devices 133c, is convenient as it does not require to upgrade the telephone or cellphone one uses. In fact as one preset equalizer may serve many conversations having the same codes, on a time-shared basis, there is a large economical benefit for this mode of "corrections".

The possibility to embed the "hearing correction" on one's personal communication device 133c or in his "hearing eyeglasses", also has some advantages when the list of "frequent callers" is short and their specific "voice characteristics" may be assessed ahead of time without their active participation. The incoming call or voice may be digitized, its average loudness compared to the Hearer's "comfortable" hearing level, and the loudness of the call or voice at the different frequencies amplified or attenuated by the ratio of the incoming call's loudness to that of the hearer's comfortable level of loudness; the amplitudes of the incoming call or voice at these frequencies are then added to the amplitudes of the base amplification factors needed to compensate for the Hearing loss at the different frequencies. These combined amplification factors are then fed to the digital equalizer that builds the volume of the call in the time domain. This corrected digitized speech is then fed to a DAC and from there to a speaker.

As mentioned above, the "Hearing profile" of person may not be recorded without his active involvement in a Q&A session and his consent. The personal voice intonation characteristics on the other hand, do not require explicit consent of the caller; they may be recorded and used to improve the quality of hearing of the called person. Consequently, the user's phones, are the place to record and store both the "Hearing profiles" of the users and the "Voice Intonation" characteristics of caller's calling this station. Once a caller's "Voice Intonation" characteristics are recorded, it may be associated with the caller's phone number and the correction may be applied immediately once the Caller's ID is known.

In addition the users of the various phones may also want to record the "Hearing profiles" of the people they use to call in order to correct the outgoing calls according to the "Hearing Profile" of the called person. Thus for example, youngsters may want to have the "Hearing Profile" of their elders in order to improve the intelligibility of their outgoing calls addressed to them.

These features may be embedded at the specific telephone, cellphone, softphone or videophone sets.

FIG. 10a illustrates the back-case of a cellphone illustrated on FIG. 9. When it is desired to listen to a call with both ears the needed corrections have to be done separately by two equalizers 121a and 121b connected to the microprocessor 120. In this case the corrected sound may be listened to using earphones or may be broadcast by 2 speakers 112a and 112b that emit plane waves that pass through alumina tenses that further focus the sound beams in the direction of the ears.

Figure 11:
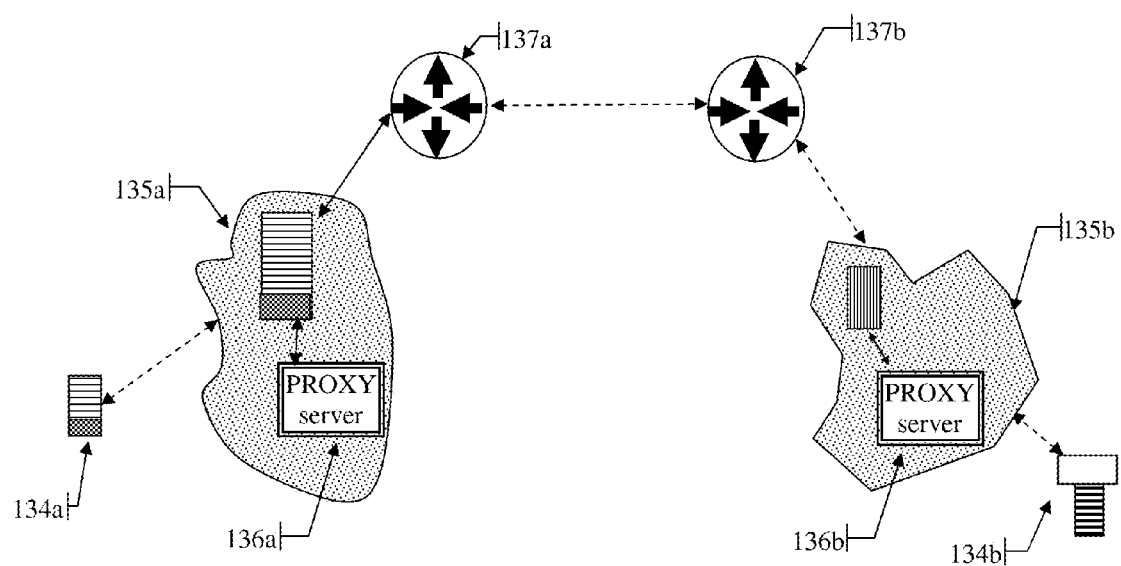
FIG. 11 illustrates Voice communication between PCs on a TCP/IP communication network where the personal "Hearing correction" data are stored in proxy servers by the Gateways and enables to correct hearing impairment of the call receiving party, taking in account the voice characteristics of the calling party.

FIG. 11 illustrates the Voice communication between PCs 134a and 134b connected to a TCP/IP communication network and talking through VoIP communication. The Proxy servers 136a and 136b storing the equalizers that "correct" the calls are placed in gateways 135a and 135b at the edges of the communication networks. The latency added by routing calls in and out of the proxy servers is minimal as the specific address of the proxy server and the specific equalizer that makes the correction are specified in the packet's "optional header extension". The route 137a, 137b between the two gateways may also be prescribed in the packet header, so that the corrections are carried out close to the user's communication device.

In VoIM communications such as the SKYPE network, voice communication may be carried out without recourse to the "Phone" application in the operating system's kernel, in order to reach the "audio drivers", but use a different proprietary application, to access the "audio drivers" in the kernel. Consequently VoIM communications networks can bypass "phone" applications whether in PSTN, IP or Cellular networks and supply peer-to-peer voice services. Consequently a "Hearing Correction" application may correct peer-to-peer calls without the need to comply with the limitations imposed by the cellular networks when transmitting calls.

Figure 12:
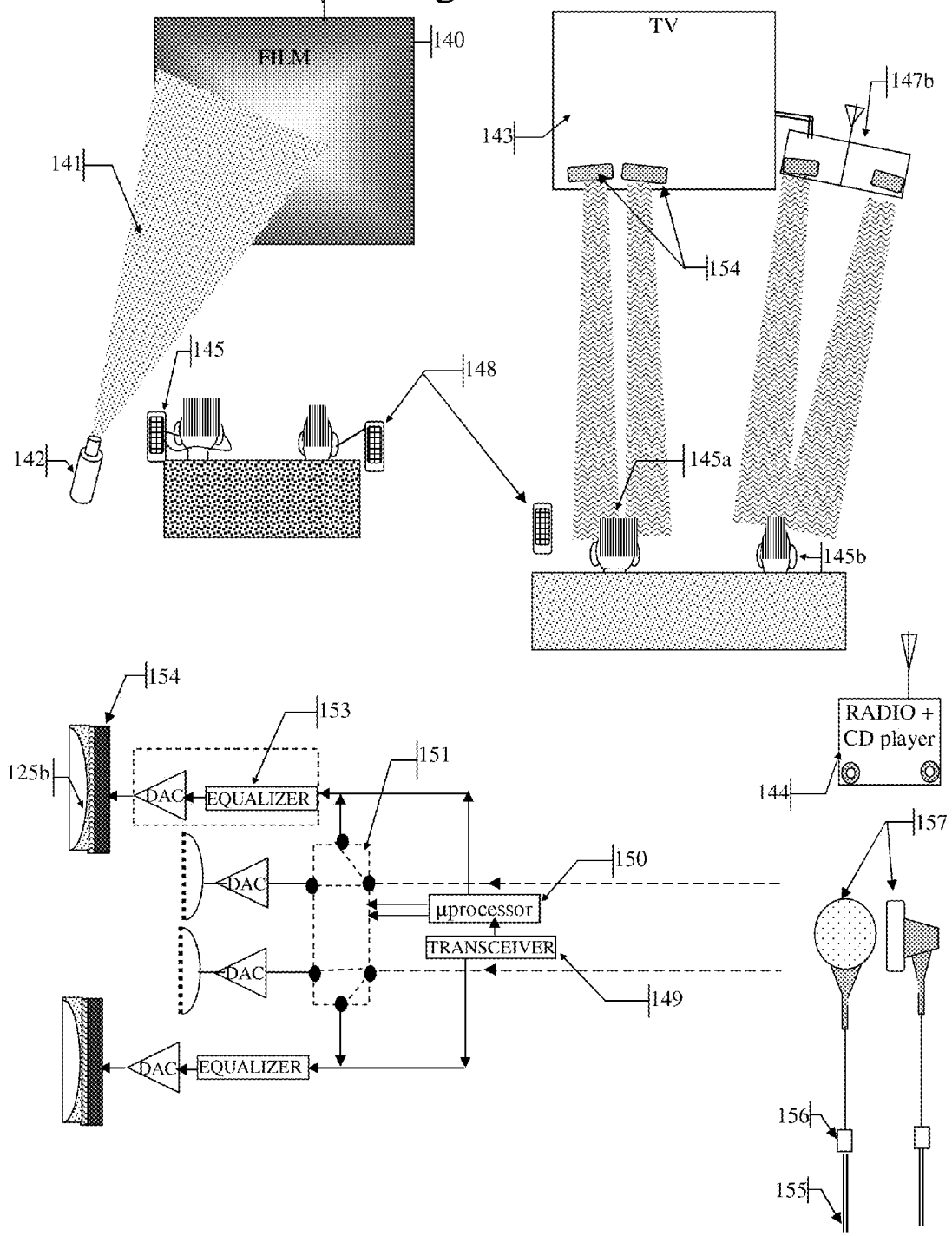
FIG. 12 illustrates the adaptation of the sounds emitted by audio appliances such as TV, CD player or Radio sets, to the listener's hearing impairment and the use of focusing speakers.

FIG. 12 illustrates several Audio-Video entertainment devices, a Video film projector 142 projecting a film 141 on a screen 140, a TV 143, and a RADIO with or without a CD player 144. The entertainment devices may have either built-in equalizers or external boxes 147b housing the equalizers. The amplification factors of the equalizers may be uploaded from the user's cellphones 145, 148 through their bluetooth transceivers, thus personalizing the listening experience according to one's hearing profile.

The personal Hearing experience is improved by listening directly to the sounds emanating from such consumer appliances after personal hearing corrections are applied through the equalizers, instead of listening to the general audio generated by these appliances directly or through personal Hearing-aids.

The unit within or outside the appliances includes a wireless transceiver 149 a microprocessor and an audio processor programmed as an equalizer 153 that also includes a DAC. A double-pole-double-throw switch 151 can transfer the digital sound signals 154 of the TV or film projector, from its original speakers to the audio processor 153. In addition the microprocessor 150 also channels the "Hearing correction" factors transmitted by the cellphone 148 and detected by the transceiver 149, to the audio processor. The equalizer output after being translated into an analog signal is transmitted to speakers 154 that emit directional plane sound waves, that also feature a sound focusing lens 125b. The focusing lens material should be of material that has a high speed of sound. The best material for this purpose is Beryllium (Be) but due to its price and machining complexities, Alumina ($Al_2e_3$) or plain aluminum (Al) are preferred. The combination of the plane wave emitting speakers and the focusing lens, emit a slightly converging sound wave that may be directed to one of the ears of the person sitting in front of the TV at close distance. At this distance the 4" wide beam is heard much better at one ear than the other. Two speakers 154 controlled by one audio processor can direct the stereo sound of the TV to the left and right ears of a person 145*a* respectively. A second similar system may serve a second person 145*b* that has a different "Hearing profile". The "Hearing Adapter" box 147*b*, may be autonomous and placed at a distance from the TV, with access to the TV sound system. The user may amplify the sound after being processed by the proper equalizer using his regular "remote" or the "volume" of his cellphone.

In Movie theaters the sound track of the film, or on the TV the sound of the featured show, may be accessible on the cellphone 145, 148. In this case the Hearing correction may be executed on an equalizer on the cellphone and the hearing corrected sound may be transmitted either through earphones or through the "plane wave emitting focusing speakers" to the ears of the person situated at a distance.

Separating the sound of a featured show or film from its video shown on a TV or a Movies screen, has multiple applications. The sound when broadcast on the Internet or a WiFi channel or by an FM transmitter, may be received by a cellphone and subsequently delivered to the ears of a person watching the show or the film, through personal earphones. In addition to delivering the sound corrected according to a person's "Hearing Profile", the sound track delivered may also be in another language, thus avoiding to read the subtitles. In fact translating the video or the film to another language may be an independent operation than making the film or the video.

The "Hearing correction" feature as illustrated in FIG. 12 may also be included in radio sets and CD players or in external add-on devices that connect to the sound channel of these appliances.

The Hearing Eyeglasses described in conjunction with FIG. 8 may also include an FM receiver that may be tuned to the desired FM frequency of an appliance such as a TV or a radio set. In this case the sounds received by the FM receiver are transmitted to the ears through the respective equalizers embedded in the bows of the "hearing eyeglasses". Earphones or headphones 157 that attach to cellphones or other sound producing devices such as MP3 players, also may incorporate preset equalizers tuned to the Hearing characteristics of the user. The equalizer's bands may be programmed ahead of time and the component inserted in a box 156 located on the cord 155 of the earphone. Power is supplied 1000 to the equalizer through the same cord that feeds the speaker 157 inserted in the ear.

There are multiple ways to realize the invention explained above, combine the differentiating features illustrated in the accompanying figures, and devise new embodiments of the method described, without departing from the scope and spirit of the present invention.

Those skilled in the art will recognize that other embodiments and modifications are possible. While the invention has been described with respect to the preferred embodiments thereof, it will be understood by those skilled in the art that changes may be made in the above constructions and in the foregoing sequences of operation without departing substantially from the scope and spirit of the invention. All such changes, combinations, modifications and variations are intended to be included herein within the scope of the present invention, as defined by the claims. It is accordingly intended that all matter contained in the above description or shown in the accompanying figures be interpreted as illustrative rather than in a limiting sense.

I claim:

1. A database of "audio communication codes" for determining the optimal sound amplitudes to be relayed to the respective ears of the parties in an electronic audio communication, comprising "hearing thresholds", "hearing loudness" and "voice intonation" tables in the spectral domain S, wherein the data elements of said tables may be related to one of the ears of the communicating person, and are enumerated in "SPL dB" units, wherein an element $(A_{TL})_i$ of the "hearing thresholds" table represents the magnitude of amplification factors $(A_{TL})$ in the spectral domain, of sounds reaching one of the ears of a person, needed to bring his hearing level to a level, equivalent to that of a normal person, and, elements $(A_L)_j$ of the "hearing loudness" table represent the loudnesses extending from the minimal to the maximal tolerable loudness levels in the spectral domain (S) including the mid-level of loudness denoted as the "comfort" level L=C and, an element $(A_V)_k$ of the "voice intonation" table represents a distribution of the voice articulation loudness levels in the spectral domain (S) and wherein, any combination of the elements $[(A_T)_i, (A_L)_j, (A_V)_k]$ of said tables may be represented by a unique code in the spectral domain (S), wherein a "multiplication" of two Codes $[(A_{TL})_i, (A_L)_j, (A_V)_k]$ and $[(A_{TL})_l, (A_L)_m, (A_V)_n]$ each attributable to a different person, is not commutative, and is defined for a "comfort" loudness level $L_i=C_i$ by $$[(A_{TC})_i,(A_{LC})_j,(A_V)_k]*[(A_{TC})_l,(A_{LC})_m,(A_V)_n]=[(A_{TC})_i+(A_{LC})_j]*(A_V)_k[\Sigma_S(A_V)_k/\Sigma_S(A_{TC}+A_{LC})_m] \quad (I);$$

or $$[(A_{TC})_l,(A_{LC})_m,(A_V)_n]*[(A_{TC})_i,(A_{LC})_j,(A_V)_k]=[(A_{TC})_l+(A_{LC})_m]*(A_V)_n[\Sigma_S(A_V)_n/\Sigma_S(A_{TC}+A_{LC})_k] \quad (II);$$

where (I) gives the optimal sound level to be channeled to the ear of one party, and (II) gives the optimal sound level to be channeled to the ear of the other communicating party.

2. A database of "audio communication codes" as in claim 1 wherein, the 'distances', $D_T$, $D_L$, and $D_V$ in SPLdB units, in the spectral domain, between the data elements (i) and the next level (i+1) in the 3 tables, defined as $$D_T=\Sigma_f(A_{TL})_i-(A_{TL})_{i+1}; D_L=\Sigma_f(A_L)_i(A_L)_{i+1}; D_V=\Sigma_f(A_V)_i-(A_V)_{i+1}$$

are of the same magnitude as are the indeterminacies in measuring said data in practice, and are of the order of ±5-7 dB wherein, any measured personal data may be approximated, for the purpose of calculating the optimal amplifications of the voice signals, by the predefined values of 'loudness in the spectral domain' most close to it, and, where f is the number of frequency bands.

3. A voice communication network storing a database of audio communication codes as defined in claim 1, where subscribers to the network are assigned a "code" representing the audio communication characteristics closest to their actual characteristics, for each of their ears and voice intonations, wherein, elements of tables included in said codes are assigned to subscribers following one of an electronic Q&A session and an audiogram performed in an audiology clinic, and electronically analysing the subscribers "voice intonation" characteristics.

4. A voice communication network as in claim 2 where the "hearing threshold", the "hearing "loudness" and the "voice intonation" characteristics in the frequency domain are self measured in a process, wherein,
the user listens to a preset list of complex tone bands, at increasing and decreasing loudness levels, and wherein,
the user's perceived "hearing threshold" level and "loudness bandwidth" in the spectral domain are recorded by defining subjectively the hearing loudness levels that start from the "don't hear" and "barely hear" levels to his "comfortable" level, up to the loud and excessively loud" levels wherein,
the natural voice of the user articulating several phrases is recorded, thereafter letting the computer software analyze the power distribution in the frequency domain using a one of fourier transform, wavelet transform and a bank of filters, wherein,
the user's measured 'hearing threshold', 'loudness levels' and 'voice intonation' characteristics are automatically compared with the lists of the predefined 'hearing threshold', 'loudness levels' and 'voice intonation' characteristic levels and,
the closest predefined characteristics, where the distances $D_T$, $D_L$, and $D_V$ in SPLdB units, in the spectral domain, between the measured (m) and predefined (p) characteristics are less than $[5N_f]$ dB, where $N_f$ is the number of frequencies, are adopted and, if one or more of the measured characteristics are not close to one of the predefined ones, they are stored until such time that additional measurements support the fact that they constitute an additional set of characteristics, at which time they are added to the audio communication codes database.

5. Voice communication devices as in claim 4 for correcting outgoing calls addressed to people with hearing loss, comprising,
means for determining the individual hearing loss at both ears of the called person, as a function of his perceived loudnesses at various frequencies, by querying him on the phone and based on his responses, assigning the called person a "code" that fits his 'comfortable' hearing characteristics, tuned to the caller's voice intonation characteristics.

6. A networked audio communication device, storing a partial database of
"audio communication codes" as defined in claim 1, suitable to users of the network listed as "contacts" of said communications device, that have assigned "codes",
representing their audio communication characteristics for each of their ears, and at least one equalizer, wherein
audio communications received by said device, and identified as a 'contact', have their audio characteristics relayed to the equalizer of said device, and the output of said equalizer transmitted to the speaker of the device and wherein,
any response to said "contact" is corrected according to the "hearing" characteristic of said contact as per his "code" and the 'voice intonation' characteristic of the sender available in his 'code'.

7. A database of audio communication codes as in claim 1, where the relative positions of its data elements in the frequency domain, each from the closest other element, representing the predefined characteristic features of the population, are gradually adjusted to better approximate the real-life self-measurements or clinical measurements of said characteristics performed by users of the database or available in medical archives.

8. A voice communication network as in claim 3 where the specific audio amplifications in the spectral domain, needed to optimize a voice communication between two parties possessing their respective 'Codes' for each ear may be implemented by two preset equalizers for each ear, each equalizer for optimizing the voice call in one of the two directions and one of the ears.

9. A voice communication network storing a database of 'audio communication codes' as defined in claim 1 wherein,
voice communications between subscribers of said network are executed by selectively modifying said voice data in the frequency domain, using equalizers located in a Bank of hardware equalizers, storing multiple copies of such preset equalizers equal to a multiple number of possible different characteristic variations, wherein,
each voice communication utilizes two preset equalizers, for the duration of the voice communication and by the end of said communication may be used for voice communication by different subscribers that have the same characteristics as the previous ones.

10. Voice communication means as in claim 1 including cellphones, landline telephones, RF transmitters, VoIP and VoIM applications wherein said means include:
hearing thresholds", "hearing loudness" and "voice intonation" tables of their users, and,
'hearing thresholds', 'hearing loudness' and 'voice intonation tables of their contacts and,
one of hardware and software equalizers whose amplification factors may be set internally and,
microprocessors for setting the band amplification factors of said equalizers given the communicating parties identities and codes given the communicating parties automatic identification by "Caller ID".

11. A voice communication network as in claim 10 wherein, the power spectrum in the spectral domain during intervals between syllables is identified as "noise" spectra and subsequently subtracted from the following speech spectra in the spectral domain.

12. A voice communication network as in claim 10 where syllable durations in transmitted speech are expanded on account of the time interval between said syllables.

13. A networked audio communication device, as in claim 10, comprising two equalizers, earphones and two focusing speakers wherein,
the received audio communication is 'corrected' according to the appended 'code' of the sender and the 'hearing profile' of each of the ears of the user and wherein,
the two equalizers outputs are fed to two DACs and their outputs to one of two focusing speakers directed each to different ears and two earphones, and,
contains amplification means for amplifying the outputs of the equalizers separately.

14. Audio-Video entertainment devices incorporating hardware and software for implementing personal audio correction processes as in claim 1 wherein,
said entertainment devices comprise one of TV set, video monitor, radio set, audio/video projector, CD player, cellular phones, tablets, earphones, headphones and combinations thereof, and wherein,
said hardware and software comprise audio equalizers for programming in real time the spectral response of loudspeakers attached to or embedded in said entertainment devices, wherein,
said entertainment devices feature a wide spectral quality of the audio broadcast by the attached loudspeakers and wherein,
the specific programming of said equalizers reside in a database accessible using a personal code and may be uploaded by wireless, to said entertainment devices using one of a keypad, a computer and a cellphone, wherein,
said programming allows to optimize the spectral features of said entertainment devices depending on the audio sources, for implementing personalized hearing improvements.

15. One of a video and television monitors as in claim 14 whose left and right audio channels are relayed to two separate equalizers and respective directional loudspeakers, wherein,
said loudspeakers located within or outside the monitor box, transmit directional sound beams whose direction may physically be set and modified, and wherein, viewers viewers of said video and television monitors may upload by wireless, their personal codes specifying their hearing preferences and select the audio channel that implements said preferences.

* * * * *